United States Patent [19]
Hashimoto et al.

[11] Patent Number: 5,062,297
[45] Date of Patent: Nov. 5, 1991

[54] METHOD OF MEASURING A PROFILE OF AN OBJECT AND AN APPARATUS FOR CARRYING OUT THE METHOD

[75] Inventors: Nobuo Hashimoto, Tokyo; Kunioki Suzuki, Shizuoka; Teruaki Saijo, Shiga, all of Japan

[73] Assignee: 501 Toray Industries, Inc., Tokyo, Japan

[21] Appl. No.: 378,991

[22] Filed: Jul. 12, 1989

[30] Foreign Application Priority Data

Aug. 16, 1988 [JP] Japan ............................... 63-203362
Aug. 16, 1988 [JP] Japan ............................... 63-203363

[51] Int. Cl.$^5$ ............................................. G01N 9/24
[52] U.S. Cl. ............................................ 73/597; 73/602
[58] Field of Search ................ 73/597, 593, 602, 620, 73/624, 633, 640, 644; 364/560, 563; 367/104, 115

[56] References Cited

U.S. PATENT DOCUMENTS

| | | | |
|---|---|---|---|
| 3,705,772 | 12/1972 | Andreas | 367/115 |
| 3,911,257 | 10/1975 | Whitehouse et al. | 364/560 |
| 4,049,954 | 9/1977 | Da Costa Vieira et al. | 73/622 |
| 4,127,033 | 11/1978 | Warren et al. | 73/622 |
| 4,597,294 | 7/1986 | Brill, III et al. | 73/640 |

*Primary Examiner*—Hezron E. Williams
*Assistant Examiner*—Louis M. Arana
*Attorney, Agent, or Firm*—Laubscher, Presta & Laubscher

[57] ABSTRACT

A method of measuring a profile of an object wherein an ultrasonic wave is radiated from an ultrasonic transducer toward an object supported by a supporting member in the water filled in a water tank, and a wave reflected at the surface of the object is detected by the transducer, and an apparatus for carrying out the method. A traversing device moves the transducer sequentially to a plurality of measurement points on an arc equidistant from a predetermined rotational center while opposing the transducer to the predetermined rotational center. A supporting device moves the supporting member relative to the transducer and sets the object in the predetermined position under water. A control device delivers a drive signal to the traversing device to move the transducer sequentially to the measurement points, causes the transducer to radiate an ultrasonic wave when the transducer is in each of the measurement points, calculates a distance between the transducer and the surface of the object in accordance with a difference between the time the transducer radiates the ultrasonic wave and the time transducer receives the wave reflected at the surface of the object, calculates coordinates of each of the measurement points, and coordinates of the surface of the object corresponding to each of the measurement points from the calculated distance, and obtains the profile of the object from the calculated coordinates of the surface of the object at each of the measurement points.

15 Claims, 20 Drawing Sheets

F I G. 14
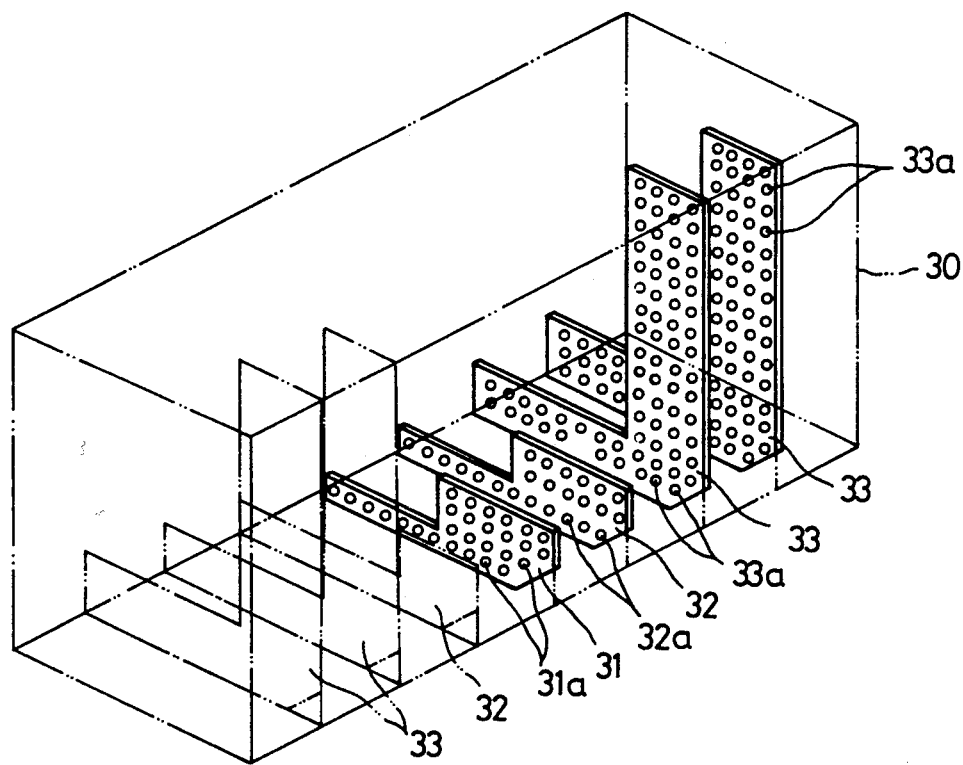

FIG. 23A
FIG. 23B
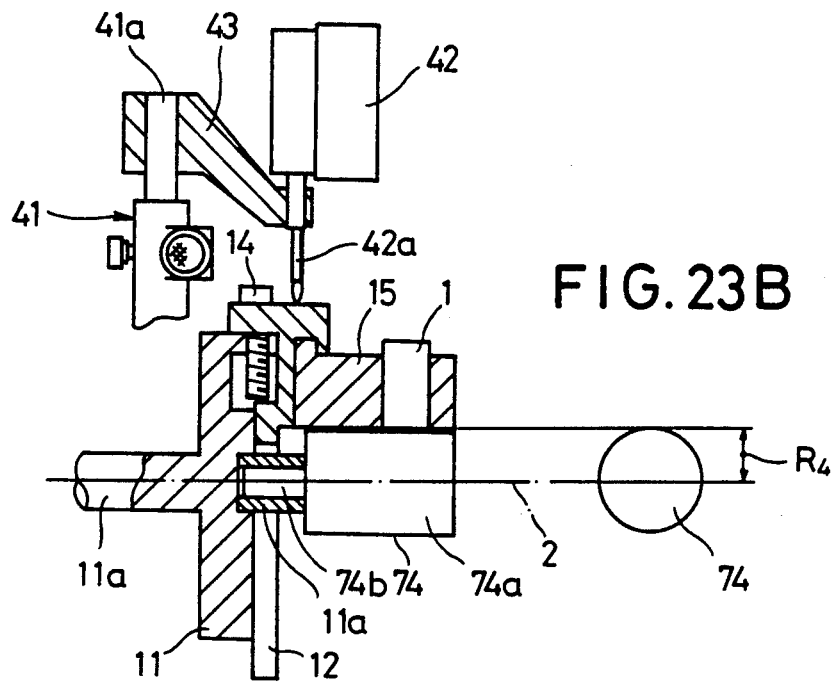
FIG. 24A
FIG. 24B
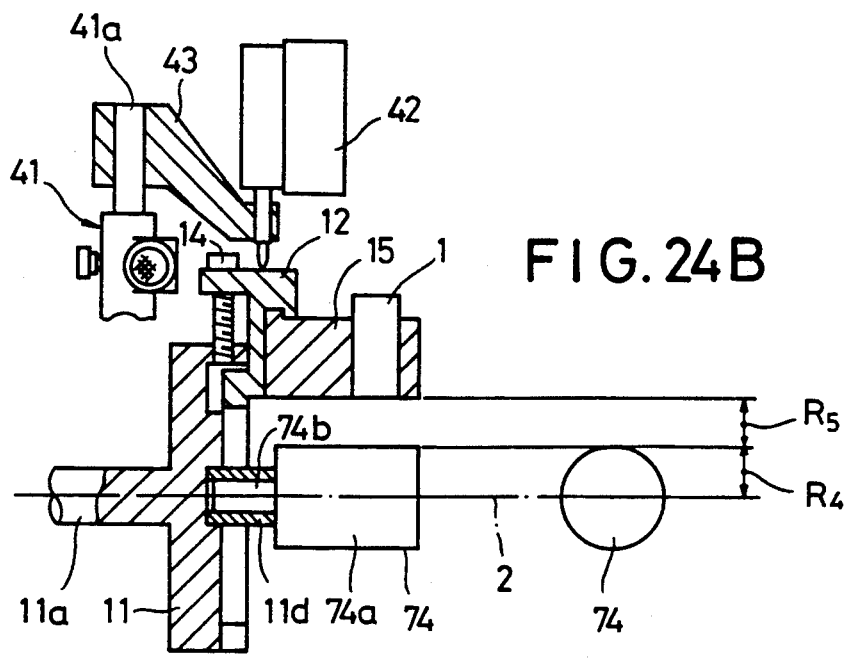

METHOD OF MEASURING A PROFILE OF AN OBJECT AND AN APPARATUS FOR CARRYING OUT THE METHOD

BACKGROUND OF THE INVENTION

The present invention relates to a method of measuring a profile of an object under the water in a non-contact and non-destructive manner and with high precision by ultrasonic waves, and a measurement apparatus for carrying out the method.

A profile of an object which is made of a hydrophilic, soft material and is wetted in use, such as a soft contact lens (hereinafter merely referred to as "lens" in the description), needs to be measured with the object kept in a condition smaller to actual use. Here, the "profile of an object" to be measured includes not only the contour of a section of the object but also the thickness, curvature radius, etc., of the object throughout the description unless otherwise defined. Conventionally, to measure the profile, a lens, taken out of water, is cut and the longitudinal section thereof is magnified using a projector, or a lens is observed while immersed under water by an optical instrument.

In the fomer method wherein the lens is taken out of water for measurement, the lens must be cut and accordingly is unsalable, and since water evaporates from the lens, the lens is deformed and thus accurate measurement cannot be ensured. Furthermore, cutting and measurement of the lens are carried out manually, and therefore measurement error varies greatly depending on the skill in measurement.

On the other hand, the latter method in which a lens under water is measured by an optical instrument is disclosed in Japanese Patent Laid-Open Publication No. 52-70849. In this method, a lens is placed on a lens table having a predetermined effective diameter, with a convex surface thereof directed upward, and a focusing plate is moved so that graduation "A" marked thereon is on a level with the vertex of the convex surface of the lens, while watching the vertex of the lens through a window formed in a side wall of a water tank by an optical system. Subsequently, the lens is moved up from the lens table by a probe so that the vertex thereof is on a level with graduation "B" of the focusing plate, whereby the base curve of the lens is obtained from the amount of movement of the measurement part. In this method, the measurement is carried out with the lens immersed under the water and therefore no deformation occurs in the lens. However, since only limited information (i.e., the effective diameter of the lens table, the distance between the graduations "A" and "B" of the focusing plate, and the distance over which the probe is moved) is available, the overall profile of the lens cannot be measured.

There have been propose a method in which ultrasonic waves are irradiated to an object to be measured, and the difference in time between reflected wave signals reflected at the surface of the object and reflected wave signals reflected at the surface of a base on which the object is placed is used to obtain the thickness of the object, a method in which ultrasonic waves are made to enter an object at the critical angle, and the attenuation of reflected waves produced as the result of leakage of elastic surface waves propagated along the surface of the object by the incident energy issued to obtain the thickness of the object (e.g., Japanese Patent Laid-Open Publication No. 60-120204), etc. In these methods, however, the ultrasonic transducer is fixed at a predetermined position relative to the object to be measured, and accordingly only thickness information at a certain point of the object can be obtained and it is not possible to obtain a thickness distribution of the object.

OBJECTS AND SUMMARY OF THE INVENTION

A primary object of the present invention is to provide a method of measuring a profile of an object, which is capable of measuring the contour of a section, the thickness, the thickness distribution, the curvature radius, and the like of a soft object such as a soft contact lens or any object immersed in the water with accuracy and in a non-contact and non-destructive manner.

Another object of the invention is to provide an apparatus for measuring a profile of a soft object such as a soft contact lens or any object immersed in the water with accuracy and in a non-contact and non-destructive manner.

The present invention provides a method of measuring a profile of an object located in a predetermined position under the water. An ultrasonic transducer is moved sequentially to a plurality of measurement points on an arc equidistant from a predetermined rotational center while being opposed to the predetermined rotational center. The ultrasonic transducer radiates an ultrasonic wave toward the predetermined rotational center at each of the measurement points on the arc. A reflected wave which has been radiated from the ultrasonic transducer and reflected at a surface of the object is received by the ultrasonic transducer. A distance between the ultrasonic transducer and the surface of the object is calculated in accordance with a difference between the time the ultrasonic transducer radiated the ultrasonic wave and the time the ultrasonic transducer received the reflected wave reflected at the surface of the object. Coordinates of the surface of the object are calculated from coordinates of each of the measurement points and the calculated distance corresponding thereto, and the profile of the object is obtained from the calculated coordinates of the surface thereof at each of the measurement points.

As needed, the thickness of the object is obtained from the coordinates of the front surface of the object opposed to the ultrasonic transducer and the coordinates of the back surface of the same.

The ultrasonic transducer is swung about the center of the ultrasonic radiation surface thereof at each of the measurement points while the intensity of the reflected wave at the surface of the object is measured, to detect an angle of swing where the intensity of the reflected wave is maximum. The coordinates of the surface of the object are obtained from the detected angle of swing, in addition to the coordinates of each of the measurement points and the calculated distance corresponding to each of the measurement points.

The coordinates of each of the measurement points are calculated from an angle of rotation by which the ultrasonic transducer is turned along the arc about the predetermined rotational center, and a reference distance between the ultrasonic transducer and the predetermined rotational center. The reference distance is obtained by preparing a reference measurement jig of which a distance between a center and a surface thereof is measurable, arranging the reference measurement jig substantially concentrically with the predetermined rotational center, radiating an ultrasonic wave from the ultrasonic transducer toward the predetermined rotational center, measuring a distance between the ultrasonic transducer and the surface of the reference measurement jig through a detection of the reflected wave at the surface of the reference measurement jig, and adding the measured distance to the distance between the center and the surface of the reference measurement jig.

The reference distance obtained in this manner is preferably corrected by arranging a calibration piece whose surface configuration and curvature radius are known, in a predetermined position in place of the object, measuring coordinates of the surface of the calibration piece at each of the measurement points while the ultrasonic transducer is moved along the arc, and calculating the curvature radius of the surface of the calibration piece from the measured coordinates so that the calculated curvature radius is substantially equal to the known curvature radius.

Preferably, the velocity of the ultrasonic wave propagated through the object is obtained by placing a test piece of substantially the same material as that of said object, a reference plane spaced at a known distance from the ultrasonic transducer, radiating an ultrasonic wave from the ultrasonic transducer toward the test piece, obtaining a thickness of the test piece and a time of propagation of the ultrasonic wave through the test piece by detecting reflected waves reflected at the front and back surfaces of the test piece, and calculating the velocity of the ultrasonic wave from the obtained thickness and propagation time.

Still preferably, a reference measurement jig, instead of the object, is arranged substantially concentrically with the predetermined rotational center, and an ultrasonic wave is radiated from the ultrasonic transducer. The ultrasonic transducer is swung about the center of the ultrasonic radiation surface while detecting a reflected wave at the surface of the reference measurement jig, and the ultrasonic transducer is fixed at a swung position where an intensity of the reflected wave detected by the ultrasonic transducer is maximum or the distance over which the ultrasonic wave is propagated from radiation and reception thereof by the ultrasonic transducer is minimum, whereby the center of propagation of the ultrasonic wave radiated by the ultrasonic transducer is set to substantially intersect the predetermined rotational center.

According to another aspect of the invention, an apparatus for measuring a profile of an object located in a predetermined position under water is provided. A supporting means supports the object in the water filled in a water tank. An ultrasonic transducer is immersed in the water filled in the water tank, for radiating an ultrasonic wave toward the object and receiving a reflected wave reflected from the surface of the object. First moving means moves the ultrasonic transducer sequentially to a plurality of measurement points on an arc opposed to the object and equidistant from a predetermined rotational center, and second moving means moves the supporting means relative to the ultrasonic transducer, and sets the object in the predetermined position in the water tank. Control and calculation means delivers a drive signal to the first moving means to move the ultrasonic transducer sequentially to the measurement points, causes the ultrasonic transducer to radiate an ultrasonic wave when the transducer is in each of the measurement points, calculates a distance between the ultrasonic transducer and the surface of the object in accordance with a difference between the time the ultrasonic transducer radiates the ultrasonic wave and the time the ultrasonic transducer receives the reflected wave reflected at the surface of the object, calculates coordinates of the surface of the object from coordinates of each of the measurement points and the calculated distance corresponding thereto, and obtains the profile of the object from the calculated coordinates of the surface of the object at each of the measurement points.

Preferably, the supporting means has a recess opposed to the ultrasonic transducer, for receiving the object, and a groove extending along the direction of movement of the ultrasonic transducer and having a bottom deeper than that of the recess. Still preferably, the recess of the supporting means comprises a circular recess, and a blind hole concentric with the circular recess, having a diameter smaller than that of the circular recess and having a conically inclined bottom surface.

Preferably, a cover is capped on the supporting means. The cover has a conical end face facing the ultrasonic transducer, and an opening extending from the conical end face to a peripheral surface thereof and coinciding with the groove of the supporting means.

Still preferably, swinging means is provided for swinging the ultrasonic transducer about the center of the ultrasonic radiation surface thereof.

According to the present invention, an object to be measured is arranged in the water, and its profile is detected by ultrasonic waves. Therefore, it is possible to accurately measure the profile of an object which contains water and, if taken out in the air, is deformed due to the evaporation of water. Ultrasonic waves can be propagated through an object, and accordingly the profile of the back surface of the object, which cannot be measured optically, can be measured in a non-destructive manner. Further, according to the invention, the ultrasonic transducer is movable and accordingly, by processing the surface position data of the object in each measurement point by a computer, various profile information, such as the overall profile of the object, the curvature radius of the surface, the thickness, the thickness distribution and the like can be obtained. The invention can be applied to the quality control of products, with the remarkable advantage that automatic quality control can be realized and inspection can be carried out for all products as the inspection is non-destructive.

The above and other objects, features, and advantages of the present invention will become more apparent from the ensuing detailed description taken in connection with the accompanying drawings.

BRIEF DESCRIPTION OF THE DRAWINGS

FIG. 14 is a perspective view of a surge damping plates arranged in a water tank shown in FIG. 5;

FIGS. 23A, 23B, 24A and 24B are sectional views illustrating operation of the measurement apparatus, for the sake of explanation of a method of measuring the distance between an ultrasonic radiation surface of the ultrasonic transducer and the center of rotation of the same;

FIGS. 25A and 25B are diagrams for illustrating a method of calibrating the distance between the ultrasonic radiation surface and the center of rotation of the ultrasonic transducer, wherein FIG. 25A is a side view of a glass ball for calibration and FIG. 25B is a partly sectional side view illustrating a profile measurement with the calibration glass ball placed on a supporting means;

DETAILED DESCRIPTION

Principle of Measuring a Profile of an Object

Figure 1:
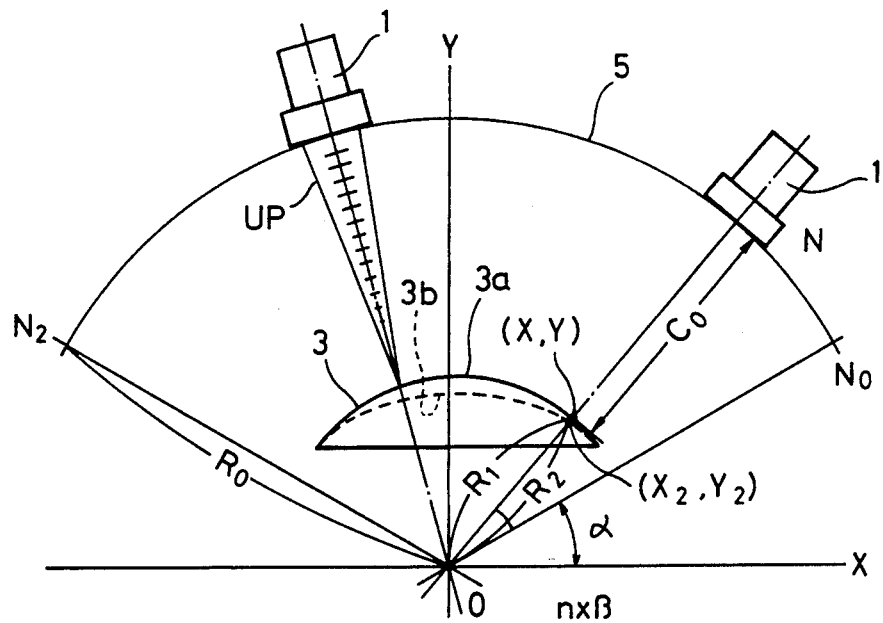
FIG. 1 is a diagram showing the positional relationship between an ultrasonic transducer and an object to be measured, having a convex surface facing the ultrasonic transducer, to explain the principle of measurement of a profile of an object according to the present invention.

The principle of measuring a profile of an object according to the present invention will be described with reference to FIG. 1, in which is illustrated an example of measuring a profile of a lens under water. In FIG. 1, an ultrasonic transducer 1 is movable sequentially and stepwise between measurement points along an arc 5 about point O as the center of rotation, by a driving unit such as a pulse motor, etc. With every movement over a very small measurement angle (scanning angle) $\beta$, the ultrasonic transducer 1 radiated ultrasonic pulses UP toward the rotational center O. A lens 3, which is an object to be measured, is arranged between the transducer 1 and the rotational center O with a convex surface (front surface) 3a thereof opposed to the ultrasonic transducer 1. Specifically, the lens 3 is arranged such that the center of the curvature of the front surface 3a (the curvature of the front curve) is substantially coincident with (or close to) the aforementioned rotational center O. Accordingly, the ultrasonic transducer 1 always faces the lens 3 and a line passing the transducer 1 and the rotational center O is substantially at right angles to the front surface 3a of the lens 3. For the ultrasonic transducer 1, a convergent type is preferably used, and therefore, the transducer 1 is located on the arc 5 such that the distance between the ultrasonic radiation surface thereof and the front surface 3a of the lens 3 is substantially equal to the focal length of the transducer 1. The measurement of profile of the lens 3 immersed in the water is carried out with the ultrasonic transducer 1.

Ultrasonic pulses UP radiated at every small scanning angle $\beta$ are reflected at the front surface 3a and back surface 3b of the lens 3, and the reflected waves are received by the ultrasonic transducer 1. In this case, given that the distance between the ultrasonic radiation surface of the transducer 1 and the center O of rotation is Ro, the angle between a reference horizontal axis X and a straight line passing the center O of rotation and the transducer 1 in a position from which measurement of profile of the lens 3 is started, i.e., a starting position $N_0$, is $\alpha$, the number of times the transducer 1 is moved at the scanning angle $\beta$ between the starting position $N_0$ and measurement position N is n, the period of generation of sampling pulses for sampling the signals received by the transducer 1 is T, the time period from the time the transducer 1 radiates an ultrasonic pulse UP to the time it receives the pulse UP reflected by the front surface 3a and returned into the water is t, the number of the above-mentioned sampling pulses generated from the time of generation of the ultrasonic pulse UP to the time the pulse UP reaches the front surface 3a of the lens 3 is Co, the velocity of sound in the water is V, the coordinates of a point on the front surface 3a measured at the measurement position N are (x,y), and the distance between the location (x,y) on the front surface 3a and the center O of rotation is R1, then the values x and y are given by the following equations (1) and (2).

$$x = R1 \times \cos(\beta \times n + \alpha) \quad (1)$$

$$y = R1 \times \sin(\beta \times n + \alpha) \quad (2)$$

$$\text{where } R1 = Ro - V \times t/2 \quad (3)$$
$$= Ro - V \times Co \times T/2 \quad (4)$$

In the above equations (1) to (4), T, Ro, V, $\alpha$, and $\beta$ are measurable values, and accordingly the coordinates (x,y) of the point on the front surface 3a can be obtained by giving the values n and Co. By obtaining the coordinates (x,y) at individual measurement points on the front surface 3a of the lens 3 while traversing the ultrasonic transducer 1 from the starting position $N_0$ to measurement end position $N_2$, the profile of the front surface of the lens 3 can be measured.

In the case of measuring a lens under water, for example, in which the acoustic impedance changes at the interface between the front surface of the lens and water and between the back surface of the lens and water, ultrasonic pulses are reflected not only at the front surface but at the back surface of the lens, and these reflection signals can be received by the ultrasonic transducer 1. By detecting the ultrasonic pulses reflected by the back surface, it is possible to obtain the coordinates $(x_2, y_2)$ of a point on the back surface 3b by the following equations (5) to (7), $$x_2 = R2 \times \cos(\beta \times n + \alpha) \quad (5)$$

$$y_2 = R2 \times \sin(\beta \times n + \alpha) \quad (6)$$

$$R2 = Ro - (V \times t/2 + V_2 \times t_2/2) \quad (7)$$

where $V_2$ is the velocity of the ultrasonic waves propagated through the lens 3, $t_2$ is the difference between the time of reception of the ultrasonic pulse signal reflected by the front surface 3a and the time of reception of the ultrasonic pulse signal reflected by the back surface 3b, and R2 is the distance between the coordinates $(x_2, y_2)$ on the back surface 3b and the center O of rotation.

Accordingly, the profile of the back surface 3b of the lens 3 can be measured by obtaining the coordinates $(x_2, y_2)$ at individual measurement points between the starting position $N_0$ and the measurement end position $N_2$ of the ultrasonic transducer 1.

Figure 2:
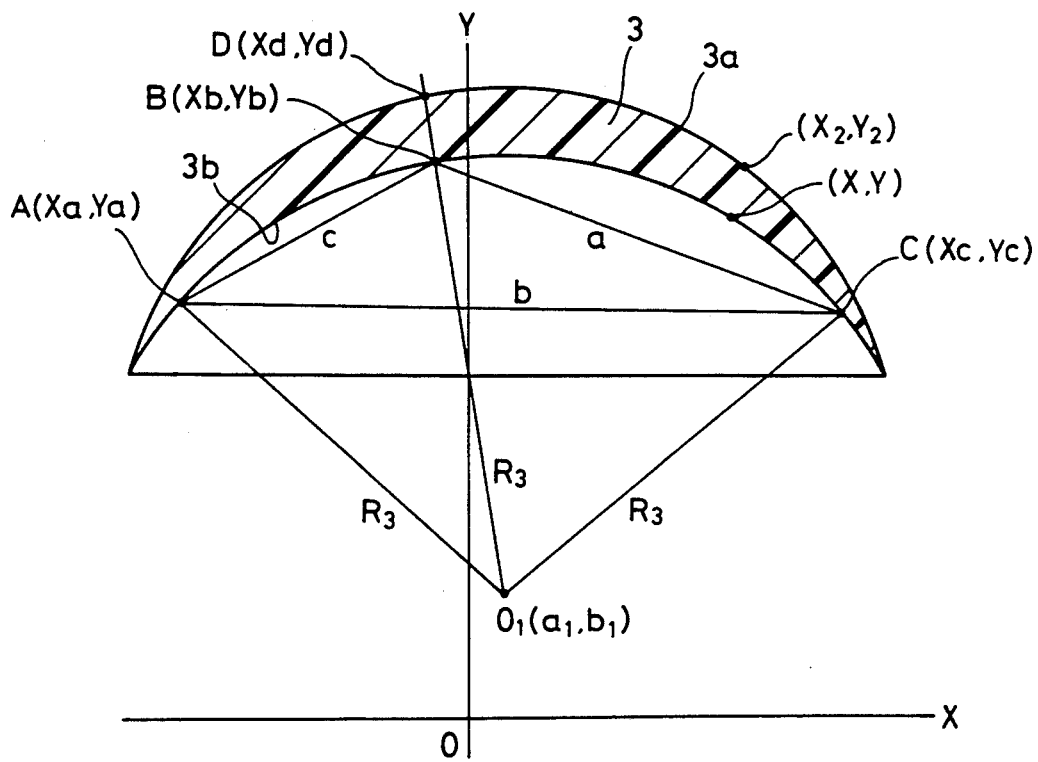
FIG. 2 is a diagram showing various points on the surface of the object to be measured, with respect to a coordinate system for calculating the curvature radius, thickness, etc., of the object.

Calculation of the Thickness and Thickness Distribution of Lens and the Curvature Radius of Base Curve Now, a method of calculating the thickness and thickness distribution of a lens, and the curvature radius of the base curve of the lens regarded as a part of a spherical body, by using the position data obtained as above, will be described with reference to FIG. 2.

Here, assuming that the back surface 3b of the lens 3 is spherical, the position data of arbitrary three points A, B, and C on the back surface 3b is selected from the measurement data obtained in the above-described manner, and their coordinates are defined as (Xa,Ya), (Xb,Yb), and (Xc,Yc), respectively. From the position data, distances BC (=a), AC (=b), and AB (=c) are known, and therefore, curvature radius R3 can be obtained from the values a, b, and c, as $$R3 = abc/\{(a+b+c)(a-b+c)(b+c-a)(b-c+a)\}^{\frac{1}{2}}$$

The coordinates (X,Y) of an arbitrary point on the base curve of the back surface 3b is given by the general formula (9).

$$(X - a_1)^2 + (Y - b_1)^2 = R3^2 \quad (9)$$

where $a_1$ and $b_1$ are the coordinates of the center $O_1$ of the curvature of the base curve. By selecting arbitrary two points from the position data of the back surface 3b and substituting their coordinates for X and Y in equation (9), the coordinates $(a_1, B_1)$ of the center $O_1$ of the curvature can be obtained. Assuming that the point of intersection of a line passing the center $O_1$ and the point B, for example, with the front surface 3a is represented by D, the coordinates (Xd,Yd) of the point D is obtained. By calculating the distance BD from the coordinate data of the points B and D, the thickness of the lens 3 can be obtained. Calculation of the thickness is carried out at predetermined intervals from one edge to the opposite edge of the lens 3, thereby obtaining the thickness distribution. The curvature radius R3 obtained from equation (8) corresponds to that of the base curve.

Figure 3:
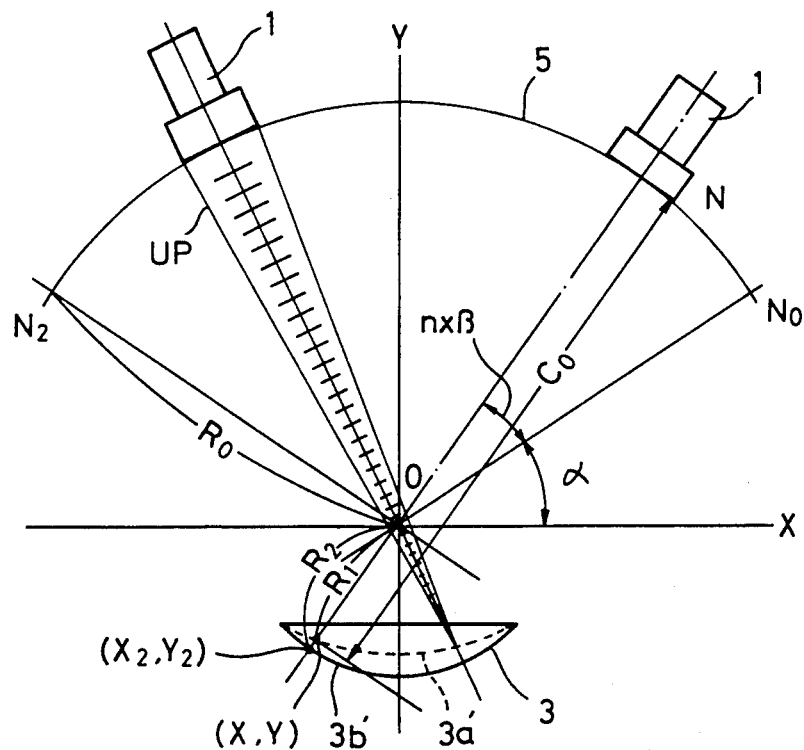
FIG. 3 is a diagram showing the positional relationship between the ultrasonic transducer and an object to be measured, having a concave surface facing the ultrasonic transducer, to explain a measurement principle similar to that of FIG. 1.

In the case of measuring a profile of a lens having a concave surface thereof opposed to the ultrasonic transducer, a method as illustrated in FIG. 3 may be preferably employed. In FIG. 3, like reference numerals are used to indicate like parts or elements in FIG. 1.

When a profile of a lens is to be measured by the method explained with FIG. 3, the lens 3 is arranged opposite to the ultrasonic transducer 1 with respect to the center O of rotation of the transducer 1. Specifically, the lens 3 has a front surface (concave surface) 3a' thereof opposed to the ultrasonic transducer 1, and is located on a side opposite to the transducer 1 with respect to the center O of rotation of the transducer 1, so that the center of the curvature of the front surface 3a' (the curvature of the base curve) is substantially coincident with (or close to) the above center O of rotation. Accordingly, the ultrasonic transducer 1 faces the lens 3, and a line passing the transducer 1 and the rotational center O is always substantially perpendicular to the front surface 3a' of the lens 3.

Also in this case, given that the distance between the coordinates (x,y) of a point on the front surface 3a' and the center of rotation is R1, x and y are obtained from the above equations (1) and (2). R1 is, in this case, obtained from equation (10).

$$R1 = V \times t/2 - Ro \quad (10)$$
$$= V \times Co \times T/2 - Ro$$

Given that the distance between the coordinates $(x_2, y_2)$ of a point on the front surface 3b' and the center O of rotation is R2, $x_2$ and $y_2$ can be obtained from equations similar to (5) to (7), but R2 is given by the following equation (11).

$$R2 = (V \times t/2 + V_2 \times t_2/2) - Ro \quad (11)$$

FIGS. 1 and 3 illustrate a general, preferred method for measurement of a profile of an object immersed in water, but the method of the present invention can be applied, though limitedly, to measurement of a profile of an object arranged between the ultrasonic transducer and the center of rotation of the transducer and having a concave surface thereof opposed to the transducer, for example. In this case, satisfactory measurement can be effected if the object to be measured has such a profile that the direction in which the ultrasonic pulses are reflected at the front and back surfaces of the object falls within a predetermined angular range (e.g., ±10°) with respect to the line passing the transducer and the center of rotation. Fundamentally, however, the profile measurability depends on the performance of the ultrasonic transducer used and the capability of the detection circuit for detecting the reflected ultrasonic pulses.

Principle of Measurement of the Profile of Lens Edge

When a profile of an object is measured by radiating ultrasonic waves from the ultrasonic transducer and detecting the reflected waves, the reflected waves need be detected reliably separate from noise and the like. To this end, the ultrasonic transducer of a convergent type is used to obtain an improved signal-to-noise ratio, but if the object to be measured has a complex profile, e.g., a rugged surface, or is largely inclined to the center of ultrasonic radiation of the transducer, the reflection signals diverge to lower the signal-to-noise ratio, thus making it difficult to accurately measure an object of complex profile.

Figure 4:
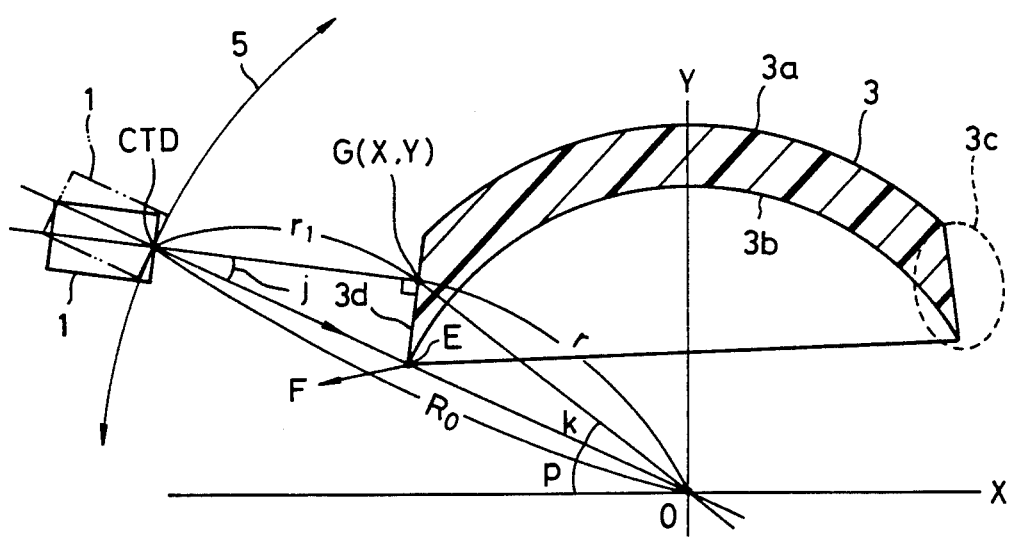
FIG. 4 is a diagram showing the positional relationship between the ultrasonic transducer and a lens, in which the edge profile of the lens is to be measured.
Figure 5:
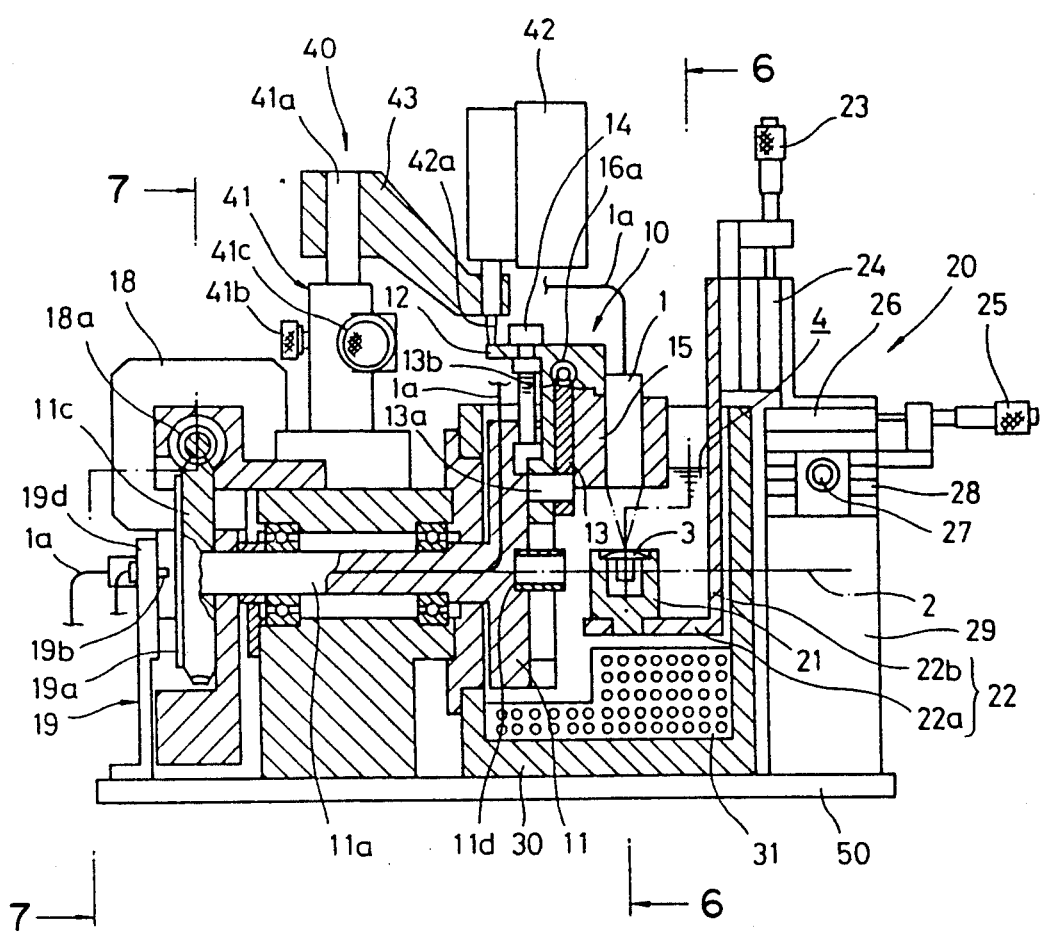
FIG. 5 is a sectional side view of a measurement apparatus to which the method of the invention is applied.

FIG. 4 illustrates a method capable of measuring a profile of an object in which the direction of reflection of the ultrasonic waves from the front and back surfaces of the object falls within the above-mentioned predetermined angular range with respect to the line passing the ultrasonic transducer and its rotational center. This method is applied, for example, to measurement of the profile of edges 3c of the lens 3.

When the ultrasonic transducer 1 is moved on the arc 5 of the radius Ro about the center O of rotation, the ultrasonic radiation surface of the transducer 1 always faces the rotational center O, as indicated by the two-dot chain line in FIG. 4. Therefore, when the profile of a side surface 3d of the edge 3c of the lens 3 opposed to the transducer 1 is to be measured, the ultrasonic pulse radiated from the center CTD of the transducer 1 is reflected at point E of the surface 3d and is propagated in the direction F. Since the reflected wave is not propagated to the center CTD of the transducer, the intensity of the reflected wave received by the transducer 1 is small and thus profile measurement cannot be carried out.

Thereupon, if the transducer 1 is swung at angle j about the center CTD thereof so that the center of ultrasonic radiation of the transducer 1 is perpendicular to the opposed surface 3d of the lens edge, then the ultrasonic pulse radiated from the transducer 1 is reflected at point G on the opposed surface 3d and follows the same way back to the transducer 1. In practice, the transducer 1 is swung about the point CTD while ultrasonic pulses are continuously radiated from the transducer 1, to find the angle j where the intensity of the reflected waves is the maximum or the propagation time of the ultrasonic pulses (the time period from the radiation of an ultrasonic pulse to the reception of the same) is the minimum. The coordinates (X,Y) of the point G can be obtained from the following equations (12) to (15).

$$X = r \times \cos(K+P) \tag{12}$$

$$Y = r \times \sin(K+P) \tag{13}$$

$$K = \tan^{-1}\{r_1 \times \sin j / (Ro - r_1 \times \cos j)\} \tag{14}$$

$$r = r_1 \times \sin j / \sin k \tag{15}$$

where P is the angle of the line passing the center CTD of the ultrasonic transducer 1 and the rotational center O with respect to the reference line (X axis), K is the angle of the line passing the center CTD and the rotational center O with respect to the line passing the point G and the rotational center O, and $r_1$ is the distance between the center CTD and the point G, measured by the transducer 1.

For the measurement of a profile of a lens, a measurement accuracy of not greater than ±10 μm is required, and therefore, the ultrasonic transducer 1 to be used should be capable of radiating ultrasonic waves with a frequency of not smaller than 30 MHz. To meet this requirement, an ultrasonic transducer provided with a macromolecular piezoelectric film, as described hereinafter, is preferably used. Further, the limit for the resolution corresponds to the half-wavelength of the reflected wave, and to achieve such resolution, it is necessary to carry out sampling at an interval shorter than the time required for the reflected wave to cover the distance corresponding to the half-wavelength. In consequence, a sampling period of at least 60 MHz is needed for the sampling of the reflected waves.

Arrangement of the Measurement Apparatus

FIGS. 5 through 16 show the arrangement of a measurement apparatus to which the method of the invention is applied. The measurement apparatus comprises a traversing device 10 for supporting the ultrasonic transducer 1 and moving the same in an arc spaced from a rotational axis 2, a supporting device 20 for supporting an object to be measured and indexing the setting positions for the object, a water tank 30, an Ro measuring device 40 for measuring the distance Ro between the ultrasonic radiation surface of the transducer 1 and the rotational axis 2, and other elements, these devices and elements being securely mounted on a base 50.

Traversing Device

First, the arrangement of the traversing device 10 will be described. A disc 11 is arranged in the water tank 30 substantially in contact with the central portion of the rear wall of the tank 30, and a rotary shaft (scanning shaft) 11a, which is integral with the disc 11 and extends from the center of the back surface thereof (the surface opposed to the rear wall of the water tank 30) at right angles thereto, rotatably projects through the rear wall of the tank 30 in a liquid-tight manner to the outside of the tank. The disc 11 is rotatable on the axis of the rotary shaft 11a as the axis 2 of rotation. A groove 11b (FIG. 6) with a predetermined width is formed in the front surface of the disc 11 (the surface opposed to an object to be measured, as mentioned later) along the diameter thereof, and a slider 12 is fitted in the groove 11b. A cylindrical boss 11d for receiving an Ro measuring jig 74 (FIG. 23A), referred to later, is mounted to the disc 11 under the slider 12.

The slider 12 is supported to be slidable along the groove 11b, and the distance Ro between the slider 12 and the above-mentioned rotational axis 2 is adjusted by an Ro adjusting screw 14. The distance Ro adjusted by the Ro adjusting screw 14 is read by the Ro measuring device 40.

The Ro measuring device 40 comprises an elevating means 41 set up on the base 50 and having a rotatable and vertically movable rod 41a, a dial gauge 42, and an arm 43 secured at on end to the rod 41a of the elevating means 41, supporting at the other end the lower end of the dial gauge 42, and extending substantially horizontally. As the adjusting screw 41c is rotated with a securing screw 41b loosened, the rod 41a of the elevating means 41 moves vertically, whereby the dial gauge 42 can be moved to a desired height. The arm 43 is turned and a probe 42a of the dial gauge 42 is brought into contact with the upper end face of the upright slider 12 of the traversing device 10, and thereafter the slider 12 is moved vertically by the above-mentioned Ro adjusting screw 14, whereby the amount of relative movement of the slider 12 can be measured. Accordingly, the distance Ro of the ultrasonic transducer 1, described hereinafter, is measured. When the dial gauge 42 is not used, the arm 43 is rotated in the direction away from the traversing device 10 so that the dial gauge 41 may not interfere with the traversing device 10.

Figure 6:
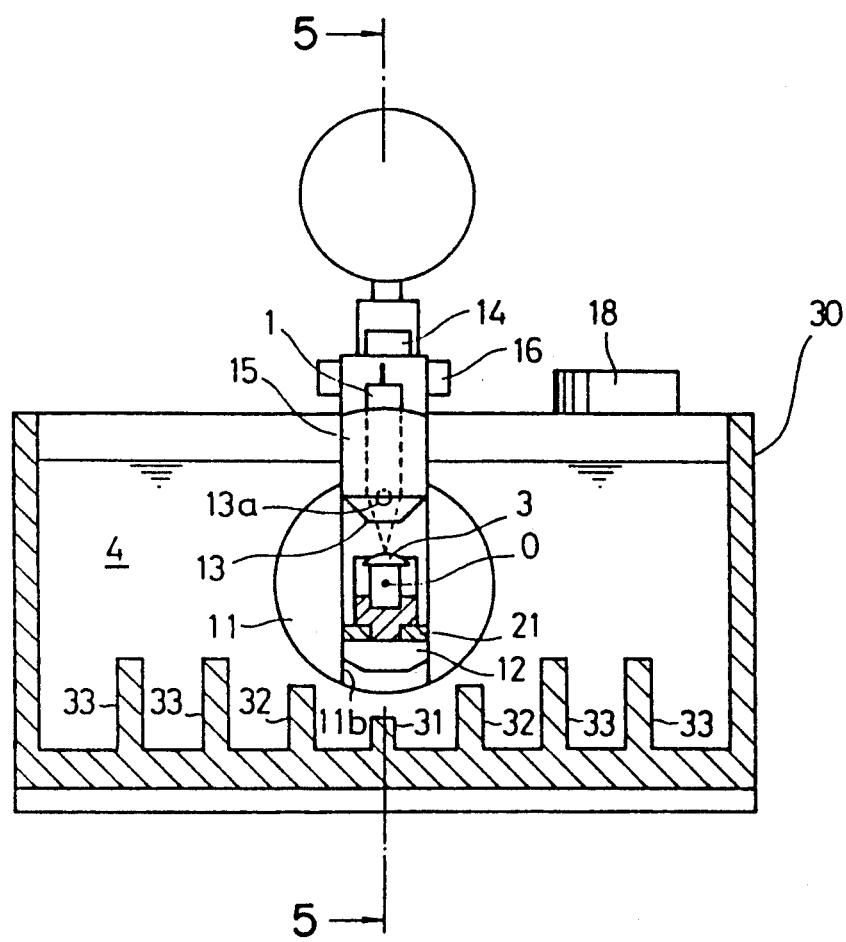
FIG. 6 is a sectional front view of the apparatus of FIG. 5.
Figure 7:
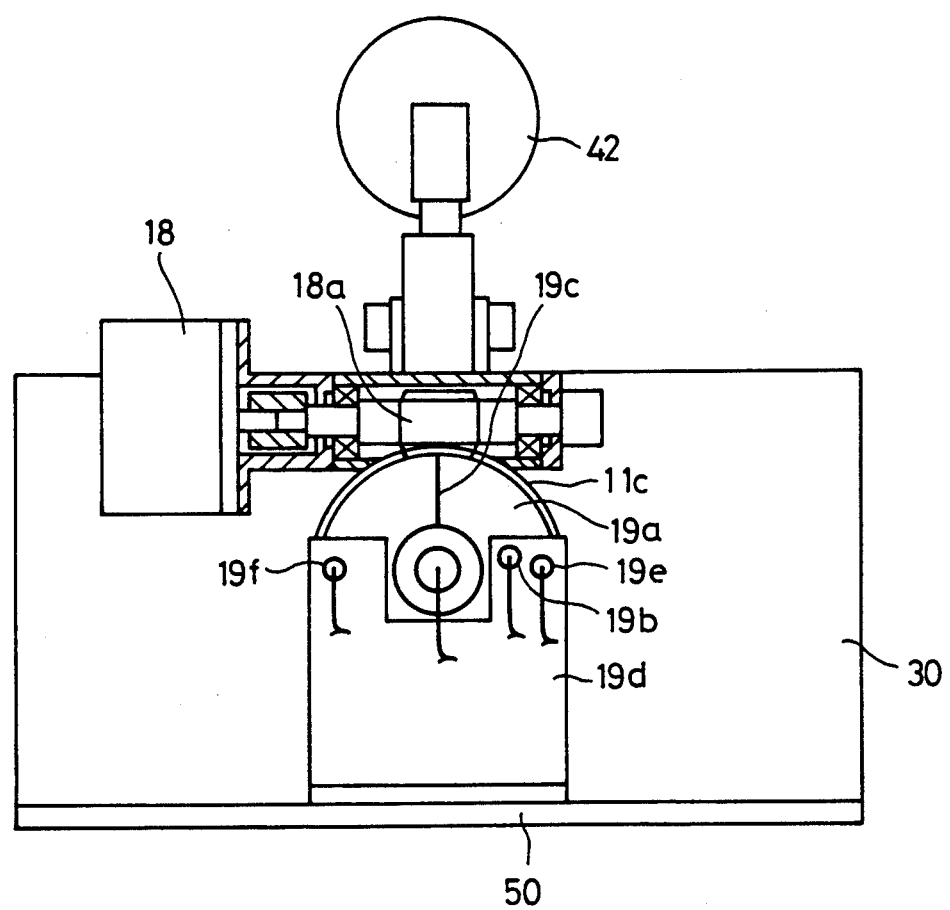
FIG. 7 is a sectional rear view of the apparatus of FIG. 5.

A rocking plate 13 is mounted to the slider 12 by a pin shaft 13a (FIG. 6). The upper end face of the rocking plate 13 is in the form of an arc about the pin shaft 13a as the center thereof, and is formed with a worm gear 13b. A worm 16a formed in an adjusting screw 16 (FIG. 6) meshes with the worm gear 13b, the adjusting screw 16 being rotatably supported by the slider side 12. The adjusting screw 16 is used to adjust angle $\gamma$ of the ultrasonic transducer 1, and as the screw 16 is turned forward or backward, the rocking plate 13 rocks about the pin shaft 13a. A holder 15 for holding the transducer 1 is secured to the rocking plate 13, and when the transducer 1 is mounted to the holder 15, it is positioned such that the ultrasonic pulses therefrom are directed to the aforesaid rotational axis 2. The transducer 1 is electrically connected to a control device 60 (FIG. 16) referred to later, by a lead wire 1a, which is embedded in the disc 11 and the rotary shaft 11a and extended to the control device side.

A worm gear 11c (FIG. 7) is securely mounted to the projecting end of the aforesaid rotary shaft 11a, and a worm 18a which is mounted to the drive shaft of a pulse motor 18 meshes with the worm gear 11c. Rotation of the pulse motor 18 is transmitted to the disc 11 at a predetermined reduction gear ratio provided by the worm 18a and the worm gear 11c. The rotational position of the disc 11 is detected by a reference rotational position detector 19. Specifically, the reference rotational position detector 19 comprises a dial plate 19a secured to the back surface of the worm gear 11c, a zero point sensor 19b, etc. A reference line 19c (FIG. 7) is marked at a predetermined position of the dial plate 19a, and the zero point sensor 19b is arranged at the back of the dial plate 19a and supported at a predetermined position by a support plate 19d set up on the base 50. The angular position of the ultrasonic transducer 1 assumed when the zero point sensor 19b detects the reference line 19c of the dial plate 19a corresponds to substantially the middle between the aforementioned starting point $N_0$ and the measurement end position $N_2$. By driving the pulse motor 18 by a predetermined rotational angle from the position where the zero point sensor 19b detected the reference line 19c, the transducer 1 can be moved to the starting position $N_0$. A left turn limit sensor 19e (FIG. 7) and a right turn limit sensor 19f (FIG. 7) are mounted to the support plate 19d at predetermined symmetrical positions of the center thereof, and when these sensors 19e and 19f detect the reference line 19c, the operation of the pulse motor 18 is stopped, whereby the disc 11 and thus the transducer 1 are prevented from turning beyond the allowable range. The left and right turn limit sensors 19e and 19f of the zero point sensor 19b are electrically connected to the control device 60 (FIG. 16) described hereinafter.

Ultrasonic Transducer

Figure 8:
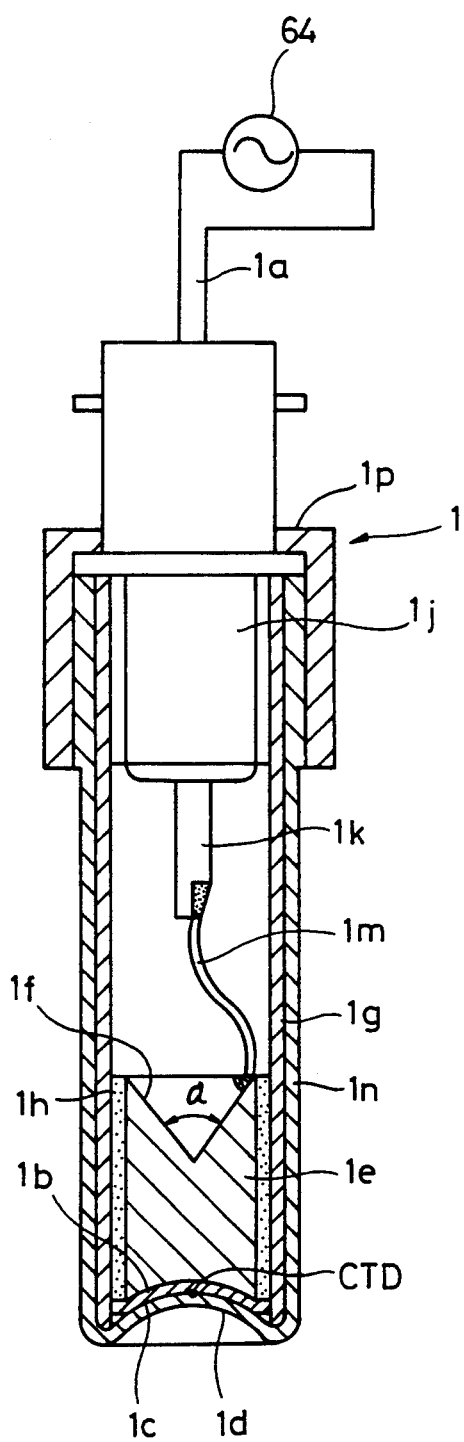
FIG. 8 is a sectional view showing the internal arrangement of an ultrasonic transducer.

FIG. 8 shows the arrangement of an ultrasonic transducer for use in the apparatus of the present invention. The ultrasonic transducer 1 has an underwater transducer type arrangement. In FIG. 8, reference symbol 1b denotes a piezoelectric element comprising a macromolecular piezoelectric film. The lower surface of the piezoelectric element 1b as viewed in the figure acts as an operating surface capable of radiating ultrasonic waves to outside and detecting ultrasonic waves from outside. A operating surface-side electrode 1c comprising a metallized layer is provided on the operating surface. A protective film 1d made of a water-resistant material is coated on the outer surface of the operating surface-side electrode 1c. The ultrasonic transducer 1 is a convergent type and accordingly the operating surface of the piezoelectric element 1b is concave (semispherical).

At the back of the piezoelectric element 1b, i.e., on the side opposite to the operating surface, is provided a block-like electrode 1e, which serves as an acoustic back load for the piezoelectric element 1b and is formed of brass. The block-like electrode 1e has an end face 1f remote from the piezoelectric element 1b, in which a control recess symmetrical in section is formed. Angle $\alpha$ of the vertex of the conical recess is preferably not greater than 90° ($\alpha \leq 90°$).

A head cover 1g serves as a signal ground for the transducer and covers the transducer substantially entirely. The head cover 1g is electrically connected to the operating surface-side electrode 1c by soldering or electroconductive bonding. A head case 1h insulates the block-like electrode 1e from the head cover 1g, and the block-like electrode 1e is fitted in the head cover 1g with the head case 1h interposed therebetween, thereby accurately setting the center of ultrasonic radiation of the apparatus.

A lead wire 1m extending from a central contact 1k of a coaxial connector 1j is connected to the end face (1f) side of the block-like electrode 1e, the body of the coaxial connector 1j being electrically connected to the head cover 1g. To the coaxial connector 1j is connected a high-frequency power supply circuit (an ultrasonic transmission/reception unit 64 of a control circuit 60 described hereinafter) for producing a high-frequency pulse voltage, by means of which the piezoelectric element 1b is expanded and contracted to product ultrasonic waves.

The outer peripheral surface of the transducer is covered with cases 1n and 1p made of resin, but these cases may be made of metal.

In the above-described arrangement, the material of the block-like electrode 1e may be a metal other than brass, such as aluminum, copper, stainless steel, or the like, or may be resin. In the case of using a resin, the surface of the resin block is subjected to a metallizing process, e.g., plating, vacuum evaporation, sputtering, etc., whereby the resin can be electrically connected to the coaxial connector having the function of an electrode. The operating surface-side electrode 1c is formed by carrying out a metallizing process using copper, aluminum, gold, nickel or the like, and coating the metallized surface with the protective film 1d, but when a water-resistant material such as gold is used, no protective film need be formed.

Further more detailed information with respect to an ultrasonic transducer will be obtained from referring to U.S. Pat. Nos. 4,577,143 or 4,578,442.

Supporting Device

Next, the supporting device 20 supporting an object to be measured will be described. The device 20 is provided for fine adjustment of the setting position of the object 3 to be measured, in the X-, Y- and Z-axis directions. Specifically, the object, e.g., the lens 3, is set in the water tank 30 while supported by a supporting means 21. The supporting means 21 is secured on a horizontal portion 22a of a bracket 22 having an L-shaped section. The bracket 22 has a vertical wall 22b extending upward above the water tank 30, and the upper end of the wall 22b is slidably attached to the tank-side wall surface of a Y-axis slide stage 24 provided with a Y micrometer 23. As a fine adjustment screw of the Y micrometer 23 is turned, the bracket 22 is allowed to move only in the Y-axis direction with respect to the Y-axis slide stage 24 (i.e., in the vertical direction, or the direction perpendicular to the rotational axis 2). The Y-axis slide stage 24 is slidably mounted to a Z-axis slide stage 26 having an L-shaped section. The Z-axis slide stage 26 is provided with a Z micrometer 25, and as a fine adjustment screw of the Z micrometer 25 is turned, the Y-axis slide stage 24 is allowed to move only in the Z-axis direction with respect to the Z-axis slide stage 26 (i.e., from right to left and vice versa as viewed in FIG. 5, or in the direction of the rotational axis 2). Further, the Z-axis slide stage 26 is slidably mounted to an X-axis slide stage 28 provided with an X micrometer 27. A a fine adjustment screw of the X micrometer 27 is turned, the X-axis slide stage 26 is allowed to move only in the X-axis direction with respect to the X-axis slide stage 28 (i.e., in the direction perpendicular to the Y-axis direction as well as to the Z-axis direction). The X-axis slide stage 28 is secured on a support post 29 set up on the base 50. As is clear from FIG. 5, the bracket 22 arranged in the water tank 22 is connected by the Y-axis slide stage 24 to the Z-axis slide stage 26, the X-axis slide stage 28, and the support post 29.

Supporting Means

Figure 9:
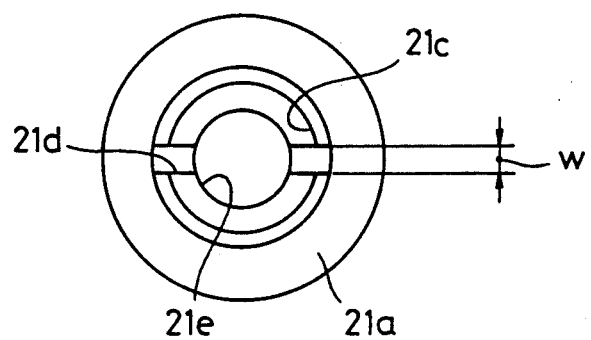
FIG. 9 is a top view of a supporting means for supporting an object to be measured, appearing in FIG. 5.
Figure 10:
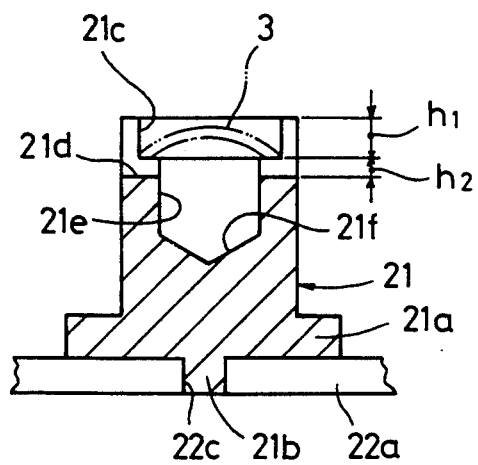
FIG. 10 is a longitudinal sectional view of the supporting means.

FIGS. 9 and 10 show the details of the supporting means for supporting an object to be measured. The supporting means 21 is generally cylindrical in shape and has a proximal end integrally formed with an annular flange 21a. The annular flange 21a serves to stably fix the supporting means 21 on the bracket 22. A small-diameter projection 21b projecting downward from the center of the bottom of the supporting means 21 is fitted in a hole 22c bored at a predetermined position of the horizontal portion 22a of the bracket 22, thereby fixing the supporting means 21 in position. In the upper end face of the supporting means 21 is formed a recess 21c with a diameter slightly greater than that of the lens 3 and a depth h1, and a blind hole 21e with a diameter smaller than that of the lens 3 is formed in a manner concentric with an contiguous to the recess 21c. A bottom surface 21f of the hole 21e is in the form of a cone having a V-shaped section. The depth h1 of the recess 21c is set to such a value that the lens 3 is never floated or moved even by a subtle flow of the water in the tank 30. The bottom surface 21f of the hole 21e is V-shaped in section and thus is inclined, so that the ultrasonic waves radiated from the transducer 1 and passed through the lens 3 are scattered and do not follow the same way back to the transducer 1 when reflected by the supporting means 21. Thus, almost only the profile information from the object 3 is permitted to be received by the transducer 1.

Also in the upper end face of the supporting means 21 is formed a groove (ultrasonic scanning groove) 21d having a depth greater than the depth h1 of the recess 21c by h2 and a width w and passing the center of the supporting means 21 in the direction of traverse of the ultrasonic transducer 1 (X-axis direction). The groove 21d enables measurement of the profile of the bevel (edge) of the lens 3. The depth h2 is set to a sufficient value such that, when ultrasonic pulses are radiated from the transducer 1, the reflection signal reflected at the surface of the lens 3 can be separated and distinguished from the reflection signal reflected at the bottom of the groove 21d below the lens 3, as described hereinafter. The groove width w is determined by assembling precision of the transducer 1 and set to a value at least greater than the diameter of converged ultrasonic pulses.

Figure 11:
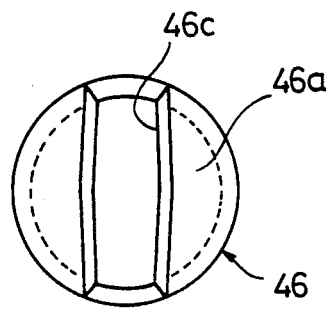
FIG. 11 is a top view of a cover of the supporting means.
Figure 12:
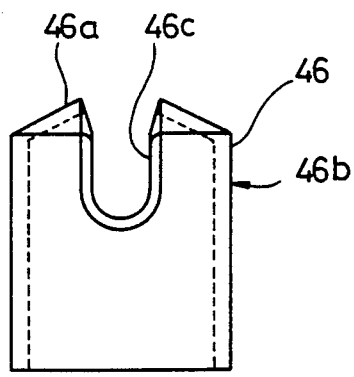
FIG. 12 is a side view of the cover.
Figure 13:
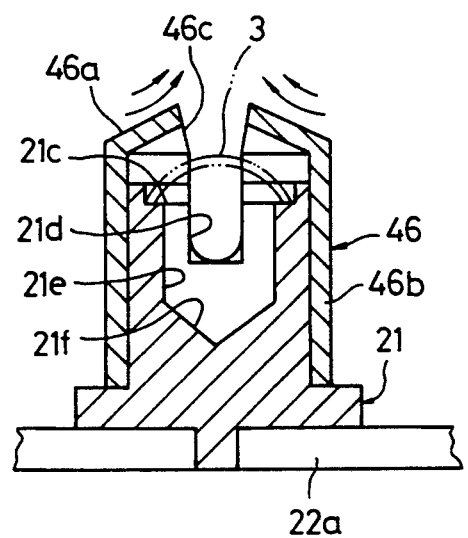
FIG. 13 is a sectional view showing the cover capped on the supporting means shown in FIG. 5.

FIGS. 11 to 13 shows a cover 46 capped on the supporting means 21 as needed, for reducing the influence of the disturbance of water caused when the ultrasonic transducer 1 is moved. The cover 46 is substantially cylindrical and open at its lower end, and has an inner diameter slightly greater than the outer diameter of the supporting means 21 so that the cover 46 is fitted around the supporting means 21. The cover 46 has a conical upper end with an upper convex end face 46a, and an opening 46c is cut in the upper end face 46a and extends in the diameter direction to an outer peripheral wall 46b thereof. The opening 46c is formed such that, when the cover 46 is fitted around the supporting means 21, it substantially coincides with the groove 21d of the supporting means 21.

After the lens 3, as the object to be measured, is placed on the supporting means 21, the cover 46 is capped on the supporting means 21, as shown in FIG. 13. The water in the tank 30, when disturbed by movement of the ultrasonic transducer 1, flows upward along the upper end face 46a of the cover 46, as indicated by the arrows in FIG. 13. Due to the conical upper end face 46a, the water flow is smooth and the disturbance of water near the lens 3 within the cover 46 can be prevented. Since the opening 46c of the cover 46 substantially corresponds in shape to the groove 21d of the supporting means 21, it does not interfere with the propagation of the ultrasonic waves radiated from the transducer 1 and reflected at the surface of the lens 3.

Surge Damping Plates

The lens 3 is merely placed on the supporting means 21, and therefore, when the ultrasonic transducer 1 is traversed under water, the water in the tank 30 is disturbed to produce a surge. It is therefore necessary that the lens 3 should not be floated or moved from the supporting means 21 by such surge. FIG. 14 show surge damping plates 31, 32 and 33 arranged in the water tank 30 for reducing, as low as possible, surging of the water caused by movement of the ultrasonic transducer 1. The surge damping plates 31, 32 and 33 each comprise a generally L-shaped plate member so that they do not interfere with the traversing device 10 or the bracket 22 of the supporting device 20. A plurality of small holes 31a to 33a are formed in the plates 31 to 33, respectively, to damp the surge in the water tank 30.

Water Level Adjusting Device

Figure 15:
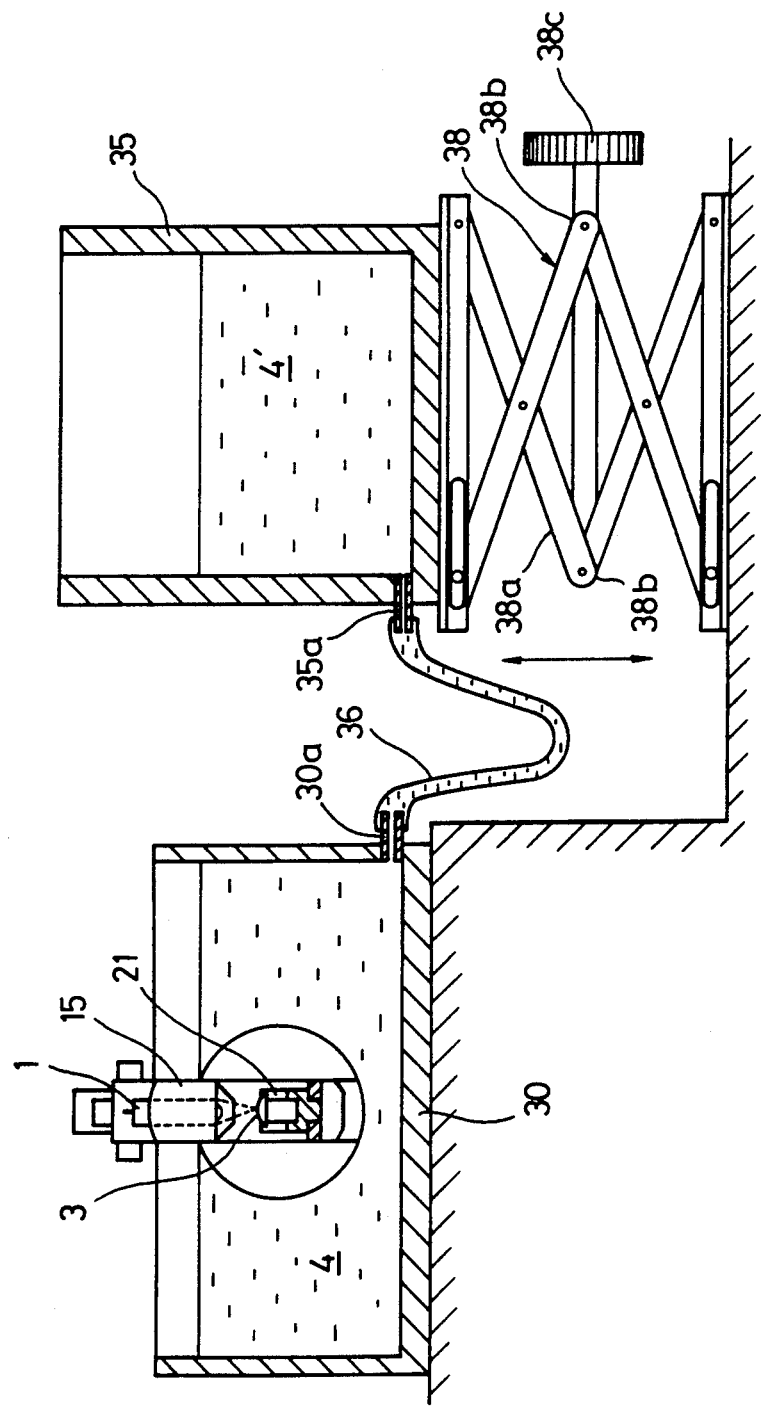
FIG. 15 is a partly sectional front view showing an arrangement of a water level adjusting device.

FIG. 15 shows a water level adjusting device which comprises a second water tank 35 vertically movably arranged near the water tank 30, an elevating device 38 for vertically moving the water tank 35, etc. A port 35a is formed near the bottom of the water tank 35, whereas a port 30a is formed near the bottom of the water tank 30. These ports 35a and 30a are connected by a flexible hose 36, thus communicating the water tanks 30 and 35 with each other. The elevating device 38 is a pantograph type comprising a plurality of links, wherein the distance between coupling points 38b, 38b of the upper and lower links of the pantograph 38a is changed by an adjusting screw 38c, to extend and collapse the pantograph 38a and thus rise and lower the water tank 35. As the water tank 35 is moved upward, water 4' in the tank 35 flows into the tank 35 through the hose 36, whereby the water level of the tank 30 rises. To lower the water level of the tank 30, the water tank 35 is lowered.

By using the water level adjusting device described above, the introduction and discharge of water into and from the water tank 30 can be carried out very easily, and the water level can be easily adjusted without splashing water or surging the water surface. If the ultrasonic transducer 1 is immersed in the water at all times, inconveniences such as peeling of the piezoelectric film are liable to occur, which lead to deterioration of the characteristics of the transducer 1. Therefore, the water level adjusting device may be used to prevent wetting of the transducer 1, by lowering the water level when the apparatus is not used, whereby the service life of the transducer 1 can be remarkable prolonged.

Control Device

Figure 16:
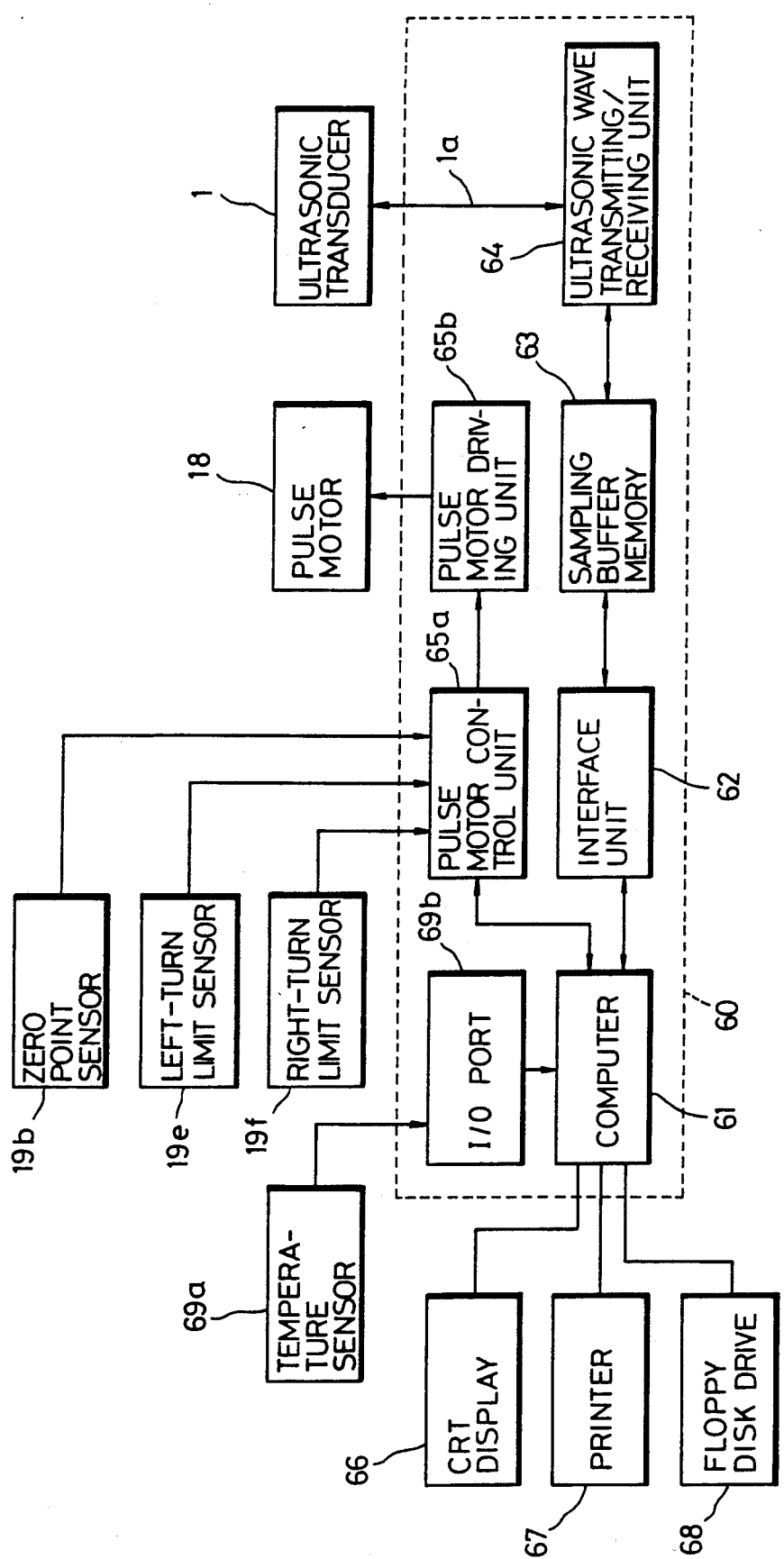
FIG. 16 is a block diagram showing an arrangement of a control unit for controlling the operation of the measurement apparatus shown in FIG. 5.

FIG. 16 shows a schematic arrangement of a control device 60. The control device 60 comprises a computer 61 which executes a predetermined program stored in a storage device, not shown, to control the operation of the traversing device 10, the radiation and reception of ultrasonic pulse signals by the ultrasonic transducer 1, judgment, processing and calculation based on various input signals, etc.; a pulse motor control unit 65a having an input connected with the aforementioned zero point sensor 19b, and left and right turn limit sensors 19e and 19f and connected to the computer 61 by a bus cable or the like; a pulse motor driving unit 65b connected to the output of the pulse motor control unit 65a, for delivering a drive signal to the pulse motor 18; an interface unit 62 connected to the computer 61 by a bus cable or the like, for the exchange of input/output data; an ultrasonic wave transmitting/receiving unit 64 connected to the interface unit 62 through a sampling buffer memory 63, for delivering a drive signal to the ultrasonic transducer 1 to radiate ultrasonic pulses therefrom, and converting the reflected ultrasonic pulses, detected by the transducer 1, into electrical signals which are supplied to the sampling buffer memory 63; a temperature sensor 69a for detecting the temperature of the water in the tank 30; an I/O port 69b connected to the input side of the computer 61, for delivering the temperature signal detected by the temperature sensor 69a, etc., to the computer 61; and other elements. To the output side of the computer 61 are connected a CRT display 66 for displaying an instruction menu for the computer 61, measurement results, etc., a printer 67 for printing the measurement results, etc., and a floppy disk drive 68 for storing data such as the measurement results.

The pulse motor 18, the sensors such as the zero point sensor 19b, the pulse motor control unit 65a, the pulse motor driving unit 65b, the temperature sensor 69a, the I/O port 69b, etc. comprise a drive/control system, whereas the ultrasonic transducer 1, the ultrasonic wave transmitting/receiving unit 64, the sampling buffer memory 63, the interface unit 62, etc. comprise a signal processing system.

Now, measurement of a profile of the lens 3, carried out by the measurement apparatus constructed as above, will be described. The control device 60 is operated through a selection of a menu displayed on the screen of the CRT display 66 by a mouse, not shown.

Measurement of the Velocity of Sound

Figure 17:
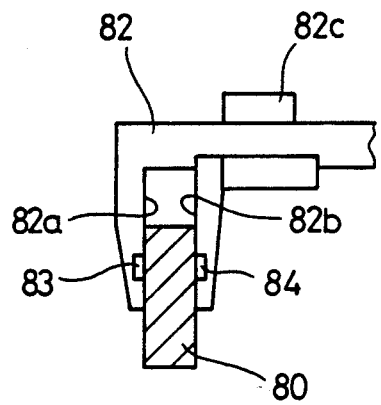
FIG. 17 is a side view of a prior art apparatus for measuring a propagation speed of ultrasonic waves (velocity of sound) within an object to be measured.
Figure 18:
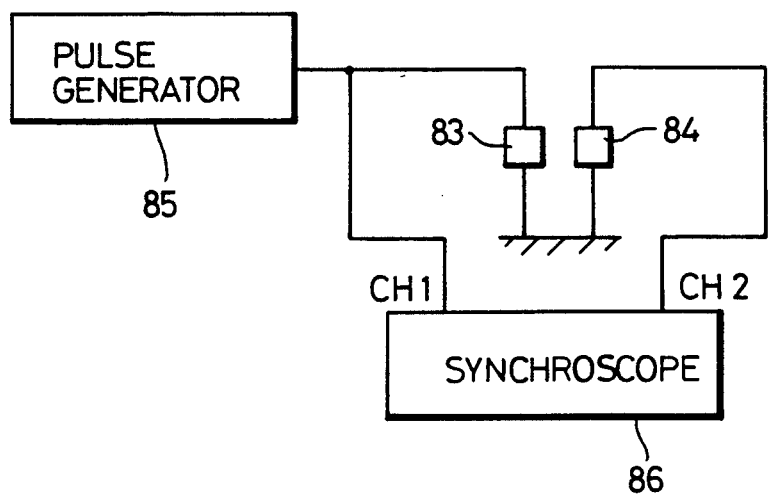
FIG. 18 is a block diagram showing a circuit arrangement used in the prior art apparatus shown in FIG. 17.

Prior to measurement of a profile of the lens 3, velocities V and $V_2$ of ultrasonic pulses propagated through the water and the lens 3, respectively, need be measured. To measure the velocity of sound propagated through an object of hydrophilic, soft material such as a soft contact lens, a method as shown in FIGS. 17 and 18 is known, which is disclosed in "In Vivo Measurement of Sound Velocity of Tissue" by Y. Takehara et al., *Japanese Journal of Medical Ultrasonics Proceedings of the 46th Meeting* (June, 1985). The prior art measurement method will be described first.

This prior art measurement method uses slide calipers 82 with an ultrasonic transducer, to measure the velocity of ultrasonic waves propagated through an object 80 to be measured. The slide calipers 82 for measuring the thickness of the object 80 have opposed measurement surfaces 82a and 82b to which a transmitter 83 and a receiver 84 of the ultrasonic transducer are attached, respectively. The calipers 82 are provided with a meter 82c for indicating the thickness of the measured object. The transmitter 83 is connected to a pulse generator 85 and to input terminal CH1 of a synchroscope 86, and the receiver 84 is connected to input terminal CH2 of the synchroscope 86. With such a measurement instrument as this, thickness D of the object 80 is indicated by the meter 82c of the calipers 82, and time t of propagation of ultrasonic waves through the object 80 is indicated by the synchroscope 86. Further, by dividing the measured thickness D by the propagation time t, the velocity $V_2$ (=D/t) of sound through the object 80 can be obtained.

With the above prior art method, however, error in the thickness measurement is significantly large when a soft object such as a lens is clamped by the calipers 82, depending on the force applied to the object 80 by the measurement surfaces 82a and 82b of the calipers 82. Furthermore, since the propagation time is read on the screen of the synchroscope 86, measurement error varies from one observer to another and the resolution is poor (several hundreds of nanoseconds).

Now, the method of measuring the velocities V and $V_2$ by using the apparatus of the invention will be described with reference to FIGS. 19A, 19B, 20A and 20B.

Figure 19A:
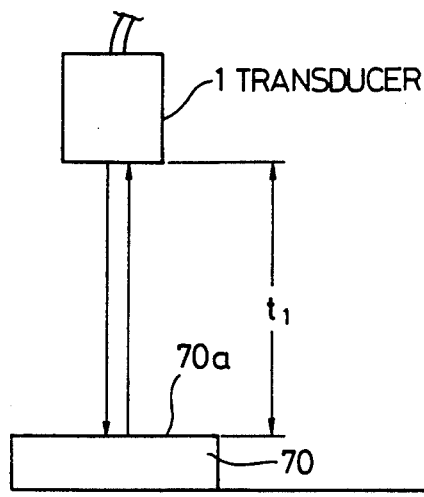
FIGS. 19A and 19B are diagrams illustrating a method of measuring the speed of ultrasonic waves propagated in the water.
Figure 19B:
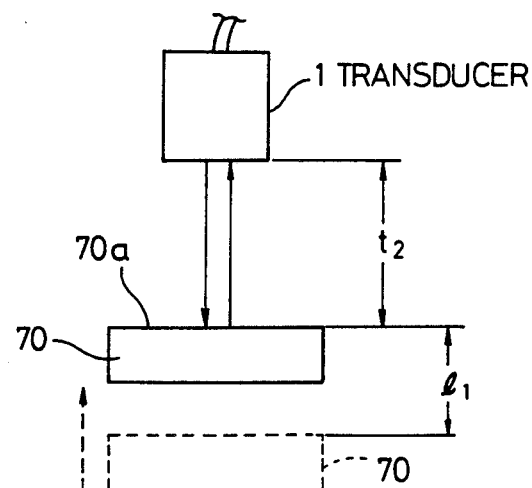

First, the pulse motor 18 of the traversing device 10 is driven to move the ultrasonic transducer 1 to a position where the reference line 19c of the dial plate 19a is detected by the zero point sensor 19b. In this position, the center of radiation of the ultrasonic transducer 1 (the direction of propagation of the ultrasonic pulses radiated from the transducer 1) coincides with the Y-axis direction, in other words, the transducer 1 is oriented in a direction turned by 90° from the X axis. Then, a reference block 70 is placed on the bracket 22 of the supporting device 20, and the water tank 35 of the water level adjusting device is moved up to gently fill the water tank 30 with water until the transducer 1 is completely immersed in the water. While in this state, ultrasonic pulses are radiated from the ultrasonic transducer 1, and propagation time $t_1$ from the time the ultrasonic pulse is radiated to the time the transducer 1 receives the ultrasonic pulse reflected at the reference surface (the surface opposed to the transducer 1) 70a of the block 70 is measured (FIG. 19A). Subsequently, the fine adjustment screw of the Y micrometer 23 of the supporting device 20 is turned to move the reference surface 70a by a suitable distance, and the distance $l_1$ moved is read from the graduations of the Y micrometer 23. Ultrasonic pulses are again radiated from the transducer 1, and the propagation time $t_2$ is measured (FIG. 19B). The velocity V of sound in the water is calculated from the following equation (A1):

$$V = |l_1|/|t_1 - t_2|/2 \qquad (A1)$$

Figure 20A:
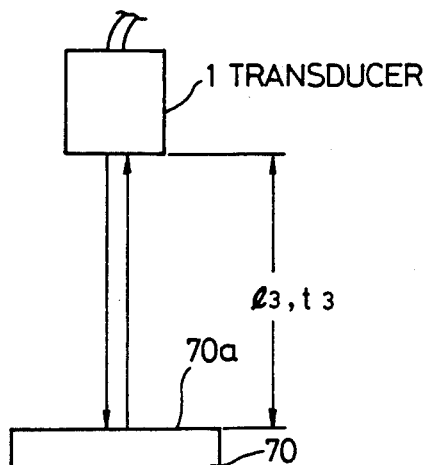
FIGS. 20A and 20B are diagrams illustrating a method of measuring the speed of ultrasonic waves propagated within an object to be measured.
Figure 20B:
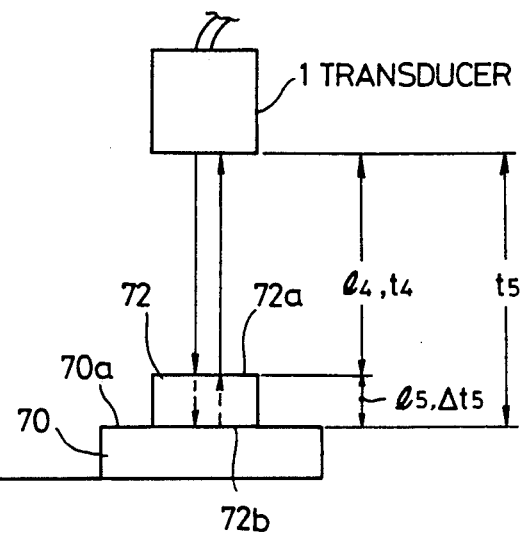

To measure the velocity of the ultrasonic pulses propagated through the lens 3 as the object to be measured, first, ultrasonic pulses are radiated from the transducer 1, as in the above method, but with no object placed on the reference block 70, and propagation time $t_3$ is measured, followed by the calculation of distance $l_3$ between the transducer 1 and the reference surface 70a, based on the velocity V of sound in the water obtained previously (FIG. 20A).

$$l_3 = V \times t_3/2 \qquad (A2)$$

Next, a test piece 72 of about 1 to 3 mm thick, made of the same material as the lens 3, is placed on the reference surface 70a, and ultrasonic pulses are radiated from the transducer 1, to measure propagation time $t_4$ of the ultrasonic pulse signal reflected at the surface 72a of the test piece 72 opposed to the transducer 1 and propagation time $t_5$ of the ultrasonic pulse reflected at the back surface 72b of the test piece 72. Then, the velocity $V_2$ of ultrasonic waves propagated through the lens is calculated from the following equations (A3) to (A6).

$$l_4 = V \times t_4/2 \qquad (A3)$$

$$l_5 = l_3 - l_4 \qquad (A4)$$

$$\Delta t_5 = (t_5 - t_4)/2 \qquad (A5)$$

$$\begin{aligned} V_2 &= l_5/\Delta t_5 \\ &= [(t_3 - t_4)/(t_5 - t_4)] \times V \end{aligned} \qquad (A6)$$

where $\Delta t_5$ is the time required for the propagation of the ultrasonic pulse through the test piece 72 with the thickness $l_5$.

Thus, the velocity of ultrasonic waves propagated through an object can be measured without contacting the object, and, if the propagation times of the ultrasonic pulses are measured at the aforementioned high-frequency sampling periods (e.g., 60 MHz), the resolution is improved (about 16 ns) and the velocity V of sound through the object can be measured with high accuracy.

In the above velocity measurement, since the water temperature influences the velocity of sound to be measured, it is preferable that the temperature of the water in the tank 30 be measured by the temperature sensor 69a and velocities V and $V_2$ of sound corrected by the water temperature during the measurement of profile of the lens be used.

Further, the reference surface 70a may be moved in either direction, upward or downward, or instead of moving the reference surface 70a, the ultrasonic transducer 1 may be moved and the amount of the movement may be measured by the dial gauge 42.

The test piece 72 which is subjected to measurement of the velocity of sound may have any shape as far as the entire surface 72b thereof can be brought into close contact with the reference surface 70a. Further, the surface of the test piece opposed to the ultrasonic transducer may be rugged to some degree if at least a portion thereof to which ultrasonic pulses are radiated is smooth.

The measurement of sound velocity described above may be carried out as required, and need not be done every time a profile of a lens is measured.

Figure 21:
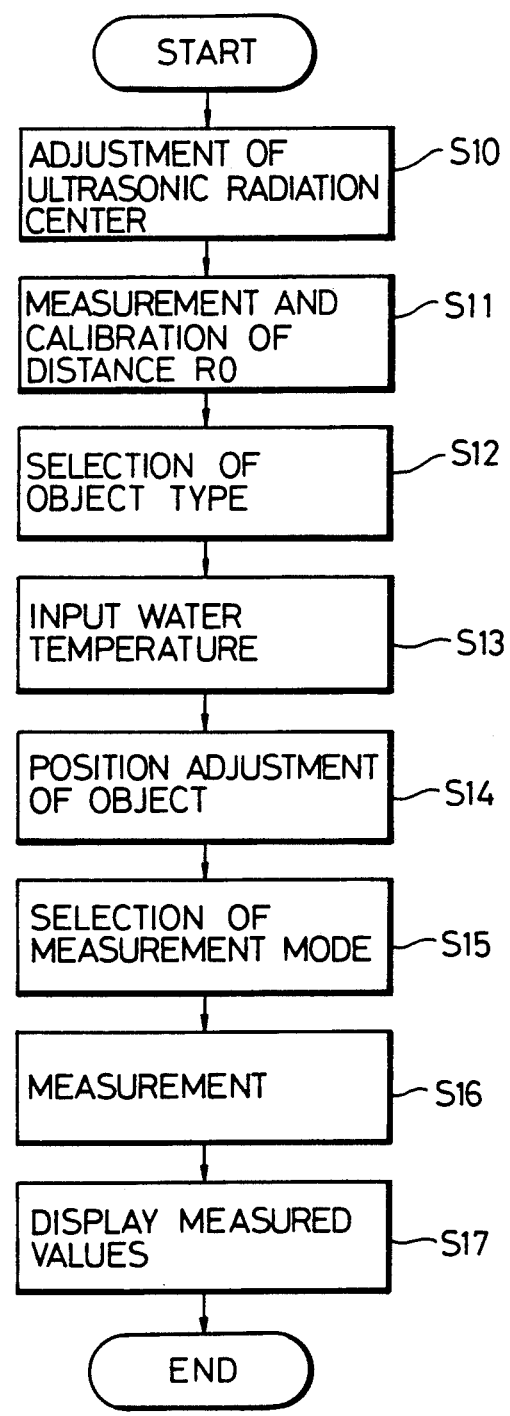
FIG. 21 is a flowchart of a process for measuring a profile of an object to be measured.

The procedure of operating the measurement apparatus will now be described with reference to the flowchart of FIG. 21.

Adjustment of the Center of Radiation of the Ultrasonic Transducer

First, the center of radiation of the ultrasonic transducer 1 is adjusted to intersect the rotational axis 2 of the same (Step S10). If the center of radiation of the ultrasonic transducer 1 is not directed exactly to the rotational axis 2, error occurs in the measurement of profile of an object. To bring the center of radiation of the transducer 1 to a position directed to the rotational axis 2, the following procedure may be taken.

First, as in the case of the measurement of the sound velocities V and $V_2$, the pulse motor 18 is driven to move the ultrasonic transducer 1 to a position turned by 90° from the X axis. Next, the an Ro measurement jig 74 is attached to the boss 11d mounted to the center of the disc 11 of the traversing device 10. The Ro measurement jig 74 comprises a cylindrical body 74a, and a projection 74b protruding perpendicularly from one end face of the body 74a and integral therewith. By fitting the projection 74b in the hole of the boss 11d, the jig body 74a can be mounted concentrically with the rotational axis 2 (see FIGS. 23A and 23B).

Figure 22:
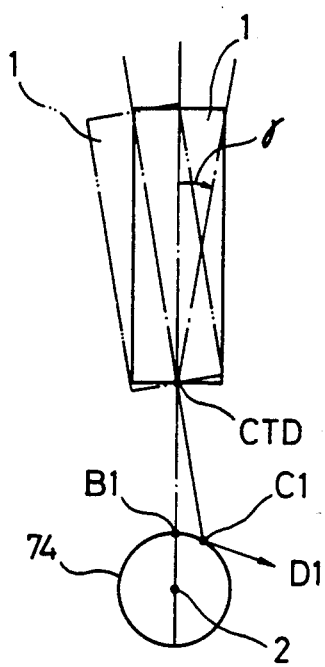
FIG. 22 is a diagram illustrating a method of adjusting the axis of the ultrasonic transducer to be coincident with the center of rotation of the same.

Subsequently, ultrasonic pulses are successively radiated from the ultrasonic transducer 1, and the intensity and propagation time of the reflected ultrasonic pulses are measured in a real-time manner. If, as indicated by the two-dot chain line in FIG. 22, the center axis of radiation of the transducer 1 does not intersect the axis 2 of rotation and accordingly the ultrasonic pulses are reflected at the surface C1 of the Ro measurement jig 74 to be propagated in the direction D1, the intensity of the reflected waves received by the transducer 1 is very low and, as is clear from the figure, the distance measured (the distance between points CTD and C1 in the figure) is greater than the distance to be measured (the distance between points CTD and B1). Thereupon, the transducer 1 is swung about the pin shaft 13a through an adjustment of the adjusting screw 16 of the aforesaid traversing device 10 (FIG. 6), so that the intensity of the reflected waves obtained from real-time data is the maximum and the distance Ro calculated by a process described later is the minimum, thereby obtaining the optimum angle γ (reference angle). In this case, the ultrasonic pulses radiated from the triangular 1 (point CTD) are propagated to the rotational axis 2, as indicated by the solid line in FIG. 22, and are reflected at point B1 of the Ro measurement jig 74 nearest to the transducer 1 and returned to the point CTD following the same way.

In this manner, the center of radiation of the ultrasonic transducer 1 is properly oriented in the direction intersecting the rotational axis 2 of the same, and if an error of the radiation center occurs during the manufacture of the body of the transducer 1, such a transducer can be calibrated with ease and precision. The jig 74 used for the calibration of the radiation center is preferably cylindrical in shape, as in the embodiment. The adjusting screw 16 may be adjusted such that the intensity of the reflected waves is the maximum and at the same time the calculated distance Ro is the minimum as mentioned above, or may be adjusted to obtain at least one of the maximum intensity and the minimum distance.

Measurement of Distance Ro

Next, measurement and calibration of the distance Ro between the radiation surface of the ultrasonic transducer 1 and the rotational axis 2 are carried out (Step S11). The method of measuring the distance Ro will be described with reference to FIGS. 23A, 23B, 24A and 24B.

Also in this case, like the measurement of the sound velocities V and $V_2$, the transducer 1 is moved by driving the pulse motor 18 of the traversing device 10, to a position where the radiation center thereof is oriented in the Y-axis direction, i.e., in the vertical direction to face the rotational axis 2. Then, the aforementioned Ro measurement jig 74 is attached to the center of the disc 11 of the traversing device 10. The cylindrical body 74a of the Ro measurement jig 74 is machined with high precision, and radius $R_4$ of the body 74a is previously measured with slide calipers, for example. The Ro adjusting screw 14 is then turned to bring the ultrasonic radiation surface of the transducer 1 into contact with the peripheral surface of the body 74a of the Ro measurement jig 74 (see FIG. 23A), and the indication of the dial gauge 42 in this state is recorded.

Subsequently, the Ro adjusting screw 14 is reversely turned to move the ultrasonic transducer 1 upward to a desired measurement position (see FIG. 24A), and the indication of the dial gauge 42 in this state is recorded. Based on the graduations of the dial gauge 42 recorded previously and this time, distance $R_5$ between the transducer 1 and the Ro measurement jig 74 is calculated (see FIG. 24B). The distance Ro is given by the following equation (B').

$$Ro = R_4 + R_5 \quad (B1)$$

This method is advantageous in that the distance Ro can be obtained easily. However, since the assembling precision of mechanical portions of the traversing device 10 has a great influence on the distance $R_5$ and the dial gauge 42 of the Ro measuring device 40 can measure only a vertical distance (along the Y-axis) due to its arrangement, a disadvantage arises in that only one point in the traverse direction of the ultrasonic transducer 1 can be measured. Further, the transducer 1 used is a convergent type and accordingly its ultrasonic generation surface opposed to the object to be measured is concaved. Therefore, the center of the radiation surface cannot be brought into contact with the peripheral surface of the Ro measurement jig 74, thus causing an error.

To eliminate these disadvantages, the distance Ro may preferably be measured by the following method.

In the foregoing method, after the Ro measurement jig 74 is attached to the disc 11, the ultrasonic transducer 1 is brought into contact with the jig 74. According to the preferred method, in contrast, the ultrasonic transducer 1 is not brought into contact with the jig 74, but is moved to a desired measurement position as shown in FIG. 24A. Then, ultrasonic pulses are radiated from the transducer 1 separated from the jig 74, to measure the distance $R_5$. More specifically, the propagation time from the time an ultrasonic pulse is radiated from the transducer 1 to the time it is received by the transducer 1 after reflected at the peripheral surface of the Ro measurement jig 74 is measured, in order to calculate the distance $R_5$. In this case, needless to say, the velocity V of ultrasonic pulses propagated through water, obtained in the aforementioned method, is also used. Using the distance $R_5$ measured in this manner and the radius $R_4$ measured with the slide calipers or the like, the distance Ro is obtained by the above equation (B1).

This method can eliminate the aforementioned error occurring when the distance $R_5$ is measured by using the dial gauge 42, as well as the error occurring when the observer reads the graduation. Further, the Ro measurement jig 74 used is cylindrical, and accordingly the ultrasonic transducer 1 may be turned around the rotational axis 2, i.e., the Ro measurement jig 74, by driving the pulse motor 18, to measure the distance Ro at a plurality of points. By averaging a plurality of values measured at various points, it is possible to obtain a further accurate distance Ro.

Calibration of Distance Ro

Figure 25A:
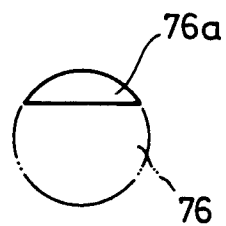
Figure 25B:
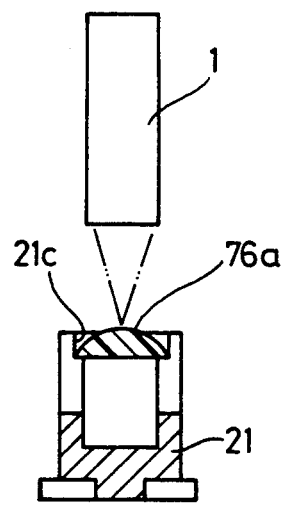

When the profile and curvature radius of the object are calculated by the above equations (1) to (10) by using the distance Ro obtained as above, the resulting values sometimes differ largely from those of a mold from which the object (lens) is formed. The error chiefly derives from the measurement error of the reference distance Ro, and far less from errors of the other parameters. Consequently, the distance Ro need be calibrated as accurately as possible (Step S11). Calibration of the distance Ro can be carried out by using a precision glass ball of which the radius is known previously. Specifically, the calibration is carried out by an optical method, or the like, as shown in FIG. 25A. A lens-like piece (reference ball) 76a which can be fitted in the recess 21c of the supporting means 21 is cut off from a precision glass ball 76 whose diameter (curvature radius) is previously known, and is placed on the supporting means 21 (FIG. 25B), and the coordinates of the convex surface of the lens-like piece 76a are measured by the measurement apparatus, as described hereinafter in detail. In this case, the reference distance Ro measured by the above-described method is used to calculate the coordinates. Then, the reference distance Ro is corrected in such a way that the curvature radius calculated by the above equation (8) is equal to the known curvature radius of the lens-like piece 76a. In order to obtain the reference distance Ro further accurately, the coordinates of the convex surface of the lens-like piece 76a and the curvature radius of the same may be repeatedly calculated by using the corrected distance Ro, until the deviation between the calculated curvature radius and the known curvature radius becomes smaller than a predetermined value.

Thus, the distance Ro can be easily calibrated, and by using the distance Ro thus calibrated in the measurement of an object, accuracy of the measurement of the object can be remarkably improved since an obtained curvature radius of the object can be compared with the known curvature radius of the glass ball, serving as an absolute value.

Instead of the precision glass ball for calibration mentioned above, various balls such as a steel ball, ceramic ball, plastic ball or the like may be used for the calibration of the distance Ro as far as they have a small coefficient of thermal expansion.

Selection of an Object to be Measured

After the adjustment and calibration described above, the type of an object to be measured is selected from the menu displayed on the screen of the CRT display (Step S12). For example, as objects to be measured, the aforementioned reference ball (glass) 76a, contact lens I (water content 78%), soft contact lens II (water content 60%), and a hard contact lens are registered. The reflection signals from these objects have different levels, and therefore, it is necessary to adjust the gains of detection of the reflected ultrasonic pulse signals by the ultrasonic wave transmitting/receiving unit 64. To this end, different gains are stored previously corresponding to the registered objects, and the gain for the selected object is read out. Also, the aforesaid sound velocities $V_2$ are stored corresponding to the individual objects, and the velocity for the selected object is read out.

Next, the temperature of the water in the tank 30 is detected by the temperature sensor 69a, and the detected value is read (Step S13). The water temperature is used to correct the value of the sound velocity in the water, and a suitable velocity in accordance with the read water temperature is automatically set.

Position Adjustment and Measurement of the Object

Subsequently, the lens 3 as the object to be measured is placed in a predetermined position (Step S14). Adjustment of the position of the object will be described with reference to FIG. 26.

After the calibration is properly carried out so that the center of radiation of the ultrasonic transducer 1 intersects the rotational axis 2, the pulse motor 18 is driven, as in the case of the calibration of the radiation center of the ultrasonic transducer 1, to move the transducer 1 to a position turned by 90° about the rotational axis from the reference X axis (i.e., the position where the radiation center of the transducer 1 is at right angles to the X axis) and is fixed. While in this position, ultrasonic pulses are successively radiated from the transducer 1, to carry out real-time measurement of the intensity of the reflected ultrasonic pulses. Based on the real-time data, the object 3 is set in position by adjusting the X, Y and Z micrometers 27, 23 and 25 of the supporting device 20, so that the intensity of the reflected waves may be the maximum. Specifically, the X and Z micrometers 27 and 25 are adjusted such that the equatorial surface of the lens 3 is scanned by the ultrasonic transducer 1, while the Y micrometer 23 is adjusted such that the ultrasonic pulses radiated from the transducer 1 are focused on the equatorial surface (opposed surface) 3a of the lens 3 to improve the signal-to-noise ratio. When the adjustment of the object 3 is finished, the radiation center of the transducer 1 is directed perpendicular to the surface of the object 3 opposed to the transducer 1.

Figure 26:
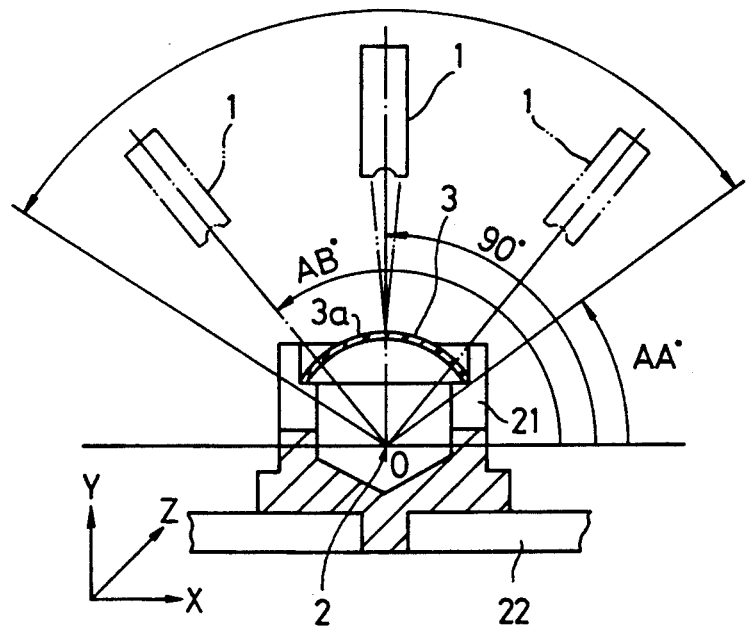
FIG. 26 is a diagram illustrating a method of locating a lens, as an object to be measured, at a predetermined position in the water tank.

To reliably set the object 3 in the predetermined position, the ultrasonic transducer 1 is moved to position AA (e.g., 45°) and position AB (e.g., 135°) indicated by the two-dot chain lines in FIG. 26, in addition to the above-mentioned position, and fine adjustment of the supporting device 20 is carried out twice or three times in a respective position such that the intensity of the reflected ultrasonic pulses is substantially the same in all positions. By doing this, the profile of the object 3 can be measured with increased precision.

Next, a measurement mode is selected (Step S15). Whether the measurement is carried out for the entirety of the lens 3 or the edge portion of the same is selected from the menu on the screen of the CRT display 66.

After completing the preparation for measurement as above, the lens 3 as the object to be measured is placed on the supporting means 21 of the measurement apparatus which has been adjusted in the above-described manner, with the convex surface thereof opposed to the ultrasonic transducer 1, and the water tank 35 of the water level adjusting device is moved up to gently fill the tank 30 with water until the transducer 1 is completely immersed in the water. The adjustment of the radiation center of the ultrasonic transducer 1 and the measurement and calibration of the distance Ro in Steps S10 and S11 of FIG. 21, respectively, need be carried out only once at the beginning of the preparation of measurement. Thereafter, only those steps following S12 are repeated.

When a switch of an operator panel, not shown, of the control device 60 is operated, the computer 61 of the control device 60 executes the predetermined program stored in the storage device, thereby carrying out measurement of a profile of the lens 3 in accordance with a predetermined procedure described below (Step S16).

First, the computer 61 drives the pulse motor 18 to move the ultrasonic transducer 1 to a position where the zero point sensor 19b can detect the reference line 19c of the dial plate 19a, and then the transducer 1 is turned by the predetermined angle to the starting position No (see FIG. 1). The computer 61 supplies drive signals to the ultrasonic wave transmitting/receiving unit 64 to cause the transducer 1 to radiate and receive ultrasonic pulses. The ultrasonic wave transmitting/receiving unit 64 not only causes the transducer 1 to radiate ultrasonic pulses, but carries out so-called analog processing, such as amplification, filtering, detection, peak hold, etc. of the reflected waves received by the transducer 1. The signals received by the ultrasonic wave transmitting-/receiving unit 64 are sampled at high speed by the sampling buffer memory 63.

The sampling buffer memory 63 can be supplied with the signals from the ultrasonic wave transmitting-/receiving unit 64 only when a gate signal is applied thereto. The delivery of the gate open signal to the sampling buffer memory 63 is started upon passage of a predetermined period after the computer 61 supplies the drive signal to the ultrasonic wave transmitting/receiving unit 64, and is ended upon passage of a predetermined period long enough to receive the reflection signals from the front and back surfaces of the lens 3 as the object to be measured. The sampling buffer memory 63 is successively supplied with and stores the states of the signals received by the ultrasonic wave transmitting/receiving unit 64 while high-level of clock pulses with a predetermined frequency (e.g., 60 MHz) are applied thereto. The input time of a reflected wave signal is determined by the address of a memory location storing the high-level signal state.

When the sampling at the starting position No is ended, the computer 61 delivers drive signals to the pulse motor driving unit 65, to turn the ultrasonic transducer 1 on the arc 5 by slight angle $\beta$ (e.g., 0.72°), and causes the ultrasonic wave transmitting/receiving unit 64 to radiate and receive ultrasonic pulses and the sampling buffer memory 63 to store the states of the signals received by the transmitting/receiving unit 64. In this manner, the sampling buffer memory 63 stores position data of the front and back surfaces 3a and 3b of the object of individual measurement points while the transducer 1 turns about the rotational center O stepwise by the predetermined angle $\beta$ from the starting position No to the measurement end position $N_2$.

When reading of the position data of the front and back surfaces 3a and 3b of the object 3 from the starting position No to the measurement end position $N_2$ is completed, the computer 61 calculates the coordinates of the surface 3a and 3b of the lens 3 based on the aforesaid equations (1) to (7). Using the coordinates obtained, the unit 61 calculates the profile of the lens 3, the curvature radius of the base curve, etc. based on the equation (8) etc., and displays the calculation results on the CRT display 66 (Step S17). The measurement data may be printed by the printer 67, or be stored in the floppy disk 68, as needed.

If the edge of the object is not smoothly continuous from the front curve, like the edge of the lens 3, and the radiation center of the ultrasonic transducer 1 is not at right angles to the measurement surface, the intensity of the ultrasonic pulses reflected at the surface of the edge portion is weak and thus the signal-to-noise ratio is lowered, making it difficult to measure the profile of the edge portion. In this case, the rocking plate 13 is moved through an adjustment of the adjusting screw 16 of the traversing device 10, to turn the transducer 1 about the pin shaft 13a, i.e., about the center CTD of the ultrasonic radiation surface of the transducer 1, thereby adjusting the aforementioned angle $\gamma$. Then, angle $\gamma$ of the transducer 1 where the intensity of the reflected waves is the maximum or the propagation time of the ultrasonic pulses is the minimum is read and keyed in from the operator panel to the computer 61. Based on the input angle $\gamma$ of rotation, the computer 61 calculates the coordinates of the concave and convex surfaces by the equations (12) to (15), calculates the profile of the edge portion in the same manner as described above, and displays the calculation results on the CRT display 66.

The adjusting screw 16 of the traversing device 10 is operated manually by the observer, as described above, and the angle $\gamma$ of rotation is read by the graduations marked on the screw 16 and input to the computer 61 as the reference angle. Alternatively, a small-sized pulse motor may be coupled to the adjusting screw 16 and connected electrically to the control device 60, so that the adjustment and reading of the rotation angle may be automatically carried out by the computer 61. In this case, the measurement time can be shortened and reading error of the observer can be eliminated, thus improving the measurement accuracy. Further, since the pulse motor is controlled by the control device, the adjusting screw 16 can be operated by a control program in which the backlash of the worm 16a and the worm gear 13a is compensated for, and thus the measurement accuracy can be further improved.

When a profile of the lens 3 is to be measured with the concave surface opposed to the ultrasonic transducer 1, the bracket 22 of the supporting device 20 is lowered and, as shown in FIG. 3, the object 3 is located on a side opposite to the transducer 1 with respect to the rotational axis 2. Except that the equations (10) and (11) are used to calculate the coordinates of the opposed surface and the back surface of the object 3, the measurement is carried out in the same manner as described above, and therefore detailed description thereof is omitted.

Figure 27:
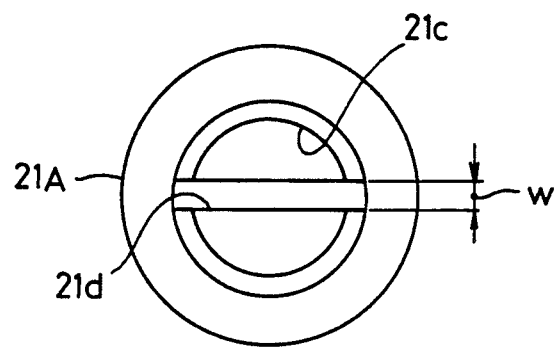
FIG. 27 is a top view showing a modification of the supporting means.
Figure 28:
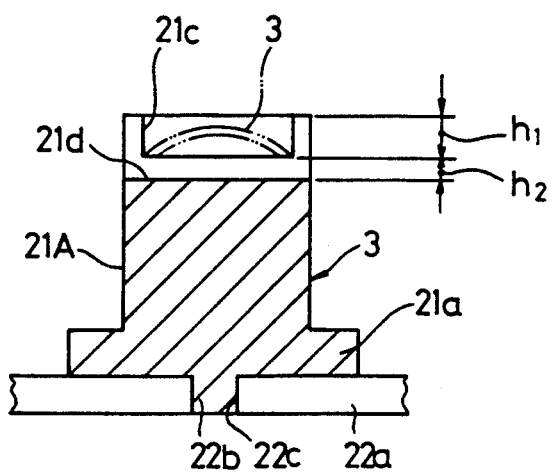
FIG. 28 is a longitudinal sectional view of the supporting means of FIG. 27.

The supporting means 21 shown in FIGS. 9 and 10 has a hole 21e of a V-shaped section in the bottom surface 21f thereof, and therefore disturbance of water produced outside of the supporting means 21 may be transmitted through the groove 21d to the inside, thus possibly moving the lens 3. To prevent this, a supporting means 21A with no such hole (21e) may be used, as shown in FIGS. 27 and 28. The supporting means 21A of FIGS. 27 and 29 has the same arrangement as the supporting means 21 of FIGS. 9 and 10, except for the hole 21e, and therefore like reference numerals are used to indicate the corresponding parts or elements and detailed description is omitted.

In the case of using the supporting means 21A of FIGS. 27 and 28, the depth h1 of the recess 21c is desirably set to a value sufficiently greater than the sag value (height) of the lens 3, and by doing so, the influence of water surge in the tank 30 can be substantially reduced.

Figure 29:
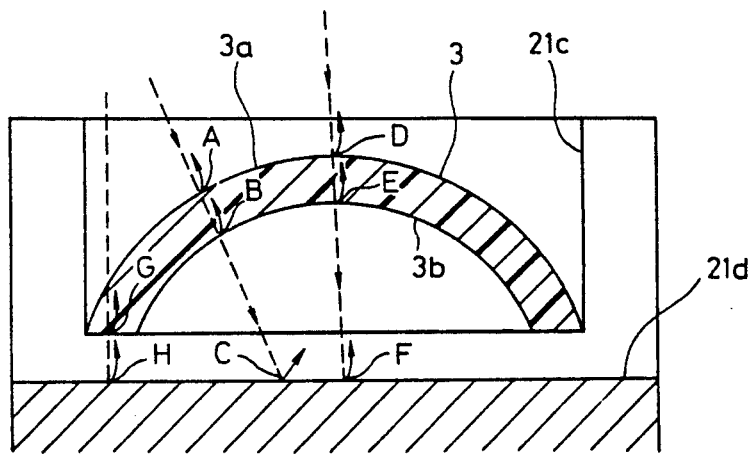
FIG. 29 is a partly enlarged sectional view showing ultrasonic waves reflected by a lens as an object to be measured, and by the bottom of a groove of the supporting means supporting the lens.

Preferably, the space below the lens 3, containing water, should be as small as possible, and the depth h2 of the groove 21d should be set to a value enough to permit the reflection pulse signal reflected at the surface of the lens 3 to be separated and distinguished from the reflection pulse signal reflected at the bottom of the groove 21d below the lens 3. As shown in FIG. 29, the ultrasonic wave obliquely incident to the bottom surface of the groove 21d of the supporting means 21A is scattered and is not returned to the ultrasonic transducer 1 (the pulse reflected at point C in FIG. 29). Thus, only the waves reflected at the front surface 3a and the back surface 3b of the lens 3 are received by the transducer 1. However, when the central portion and the edge portion of the lens 3 are measured, the ultrasonic pulses reflected at the bottom surface of the groove 21d of the supporting means 21A (the pulses reflected at points F and H) are returned to the transducer 1. To reliably distinguish the waves reflected at points F and H from those reflected the the surfaces 3a and 3b of the lens 3, the depth h2 of the groove 21d must be set taking the following into account.

Figure 30:
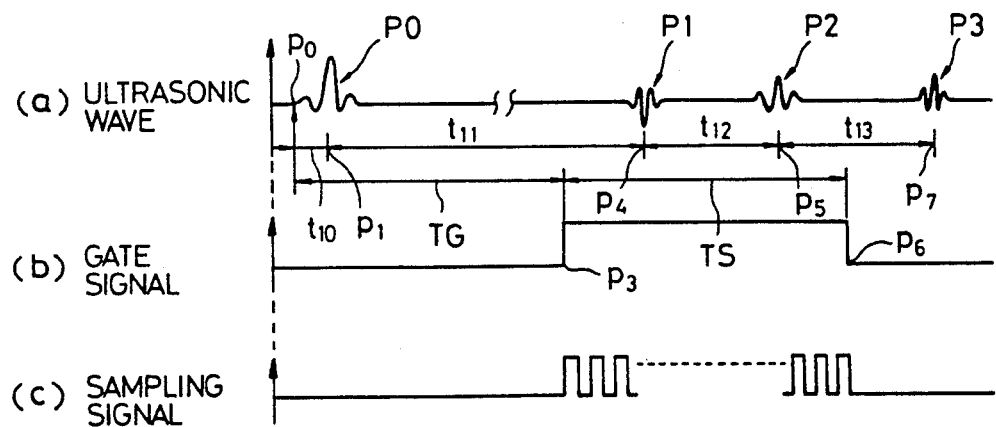
FIG. 30 is a timing chart illustrating the relationship of timing at which the ultrasonic transducer transmits and receives ultrasonic waves, with timing at which a sampling buffer memory shown in FIG. 16 samples the ultrasonic pulses received by the ultrasonic transducer.

FIG. 30 shows the relationship between the timing of generation of ultrasonic pulse signals transmitted and received by the transducer 1 and the timing of sampling of the reflected pulse signals by the sampling buffer memory shown in FIG. 16. The transducer 1 radiates ultrasonic pulse P0 at time p1 upon lapse of ineffective time period t10 after the ultrasonic wave transmitting/receiving unit 64 is supplied with the drive signal at time p0, and sequentially receives pulse P1 reflected at the opposed surface 3a of the lens 3 at time p4 upon lapse of time period t11, pulse P2 reflected at the back surface 3b of the lens 3 at time p5 upon lapse of time period t12, and pulse P3 reflected at the groove 21d of the holder 21 at time p7 upon lapse of time period t13. The computer 61 delivers the gate signal to the sampling buffer memory 63 at time p3 upon lapse of time period TG after the delivery of the drive signal at time p0, thereby starting the sampling of the sampling buffer memory 63, and stops the delivery of the gate signal at time p6 after passage of time period TS. Therefore, the output timing of the gate signal (time period TS), and the time t13, i.e., the groove depth h2 corresponding to the distance over which the ultrasonic pulse is propagated, are set to suitable values such that sampling buffer memory 63 can read the pulses P1 and P2 reflected at the front and back surfaces, respectively, within the sampling period TS, regardless of which measurement position between the starting position No and the measurement end position $N_2$ the ultrasonic transducer 2 is located. The suitable values for the time period TS and the groove depth h2 vary depending on the frequency of ultrasonic waves, the sampling interval, the profile and thickness of an object to be measured, etc.

As described above, by detecting the pulses P1 and P2 reflected at the front end and back surfaces of the lens 3 only during the sampling period TS, the waves reflected at the bottom of the groove of the supporting means 21A can be excluded and the measurement of a profile of an object can be carried out with reliability. Moreover, if the groove depth h2 is set to the smallest possible value satisfying the above-mentioned condition, the space for water defined under the lens 3 supported by the supporting means 21A can be reduced, whereby floating of the lens 3 by the water surge can be eliminated with a simplified structure.

Figure 31:
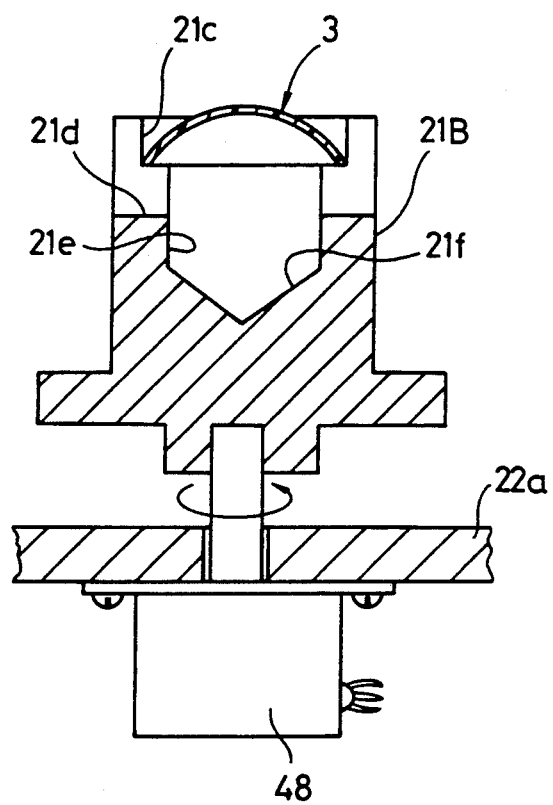
FIG. 31 is a sectional view showing still another modification of the supporting means for supporting the object.

FIG. 31 shows another modification of a supporting means. In FIG. 31, the supporting means 21B is rotatable by a small-sized pulse motor 48 arranged at the center of the bottom thereof. The motor 48 is connected to the computer 61 of the control device 60, and the angle of rotation of the supporting means 21B can be detected from the drive signal supplied to the motor 48. By rotating the supporting means 21B, the section of the lens 3 to be measured can be varied, and the measurement of individual sections can be automatically carried out by the control device 60.

The method of measuring a profile of an object according to the present invention can be applied not only to a lens immersed in the water, but also to objects of various materials under the water, such as metal, glass, ceramic, plastic, etc.

What is claimed is:

1. A method of measuring a profile of an object located in a predetermined position under water, comprising the steps of:

moving an ultrasonic transducer sequentially to a plurality of measurement points on an arc equidistant from a predetermined rotational center while opposing said ultrasonic transducer to the object;

radiating an ultrasonic wave from said ultrasonic transducer toward said predetermined rotational center when said ultrasonic transducer is in each of said measurement points on said arc;

receiving a reflected wave which has been radiated from said ultrasonic transducer and reflected at a surface of said object, by said ultrasonic transducer;

calculating a distance between said ultrasonic transducer and the surface of said object in accordance with a difference between the time said ultrasonic transducer radiated the ultrasonic wave and the time said ultrasonic transducer received the reflected wave reflected at the surface of said object;

calculating coordinates on the surface of said object from coordinates of each of said measurement points and the calculated distance corresponding thereto; and obtaining a profile of said object from the calculated coordinates of the surface thereof in each said measurement point;

said ultrasonic transducer being swung about a center of the ultrasonic radiation surface thereof at each of said measurement points while an intensity of the reflected wave at the surface of said object is measured, to detect an angle of swing where the intensity of the reflected wave is maximum, and said coordinates of the surface of said object are obtained from the detected angle of swing, in addition to the coordinates of each of said measurement points and the calculated distance corresponding to each of said measurement points.

2. The method according to claim 1, wherein said object has a convex surface opposed to said ultrasonic transducer and is arranged between said predetermined rotational center and said ultrasonic transducer.

3. The method according to claim 1, wherein said object has a concave surface opposed to said ultrasonic transducer and is arranged on a side opposite to said ultrasonic transducer with respect to said predetermined rotational center.

4. The method according to claim 1, wherein the profile of said object is obtained from coordinates of a front surface thereof opposed to said ultrasonic transducer and coordinates of a back surface thereof.

5. The method according to claim 4, wherein a thickness of said object is obtained from the coordinates of the front surface thereof opposed to said ultrasonic transducer and the coordinates of the back surface thereof.

6. The method according to claim 1, wherein said coordinates of each of said measurement points are calculated from an angle of rotation by which said ultrasonic transducer is turned along said arc about said predetermined rotational center, and a reference distance between said ultrasonic transducer and said predetermined rotational center, said reference distance being obtained by preparing a reference measurement jig of which a distance between a center and a surface thereof is measurable, arranging said reference measurement jig substantially concentrically with said predetermined rotational center, radiating an ultrasonic wave from said ultrasonic transducer toward said predetermined rotational center, measuring a distance between said ultrasonic transducer and the surface of said reference measurement jig through a detection of the reflected wave at the surface of said reference measurement jig, and adding the measured distance to the distance between the center and the surface of said reference measurement jig.

7. The method according to claim 6, wherein said reference distance is corrected by arranging a calibration piece whose surface configuration and curvature radius are known, in a predetermined position in place of said object, measuring coordinates of a surface of the calibration piece at each of measurement points while said ultrasonic transducer is moved along said arc, and calculating the curvature radius of the surface of the calibration piece from the measured coordinates so that the calculated curvature radius is substantially equal to the known curvature radius.

8. The method according to claim 4, wherein said coordinates of the back surface of said object are calculated based on a difference between the time said ultrasonic transducer receives the reflected wave reflected at the front surface of the object and the time said ultrasonic transducer receives the reflected wave reflected at the back surface of the object, and a velocity of the ultrasonic wave propagated through the object, said velocity of the ultrasonic wave being obtained by placing a test piece of substantially the same material as that of said object, on a reference plane spaced at a known distance from said ultrasonic transducer, radiating an ultrasonic wave from said ultrasonic transducer toward said test piece, obtaining a thickness of said test piece and a time of propagation of the ultrasonic wave through said object by detecting reflected waves reflected at the front and back surfaces of said test piece, and calculating said velocity of the ultrasonic wave from the obtained thickness and propagation time.

9. The method according to claim 1, wherein a center of propagation of the ultrasonic wave radiated by said ultrasonic transducer is set to substantially intersect said predetermined rotational center by arranging a reference measurement jig, instead of said object, substantially concentrically with said predetermined rotational center, radiating an ultrasonic wave from said ultrasonic transducer, swinging said ultrasonic transducer about a center of the ultrasonic radiation surface thereof while detecting a reflected wave at the surface of said reference measurement jig, and fixing said ultrasonic transducer at a swung position where an intensity of the reflected wave detected by said ultrasonic transducer is maximum.

10. The method according to claim 1, wherein a center of propagation of the ultrasonic wave radiated by said ultrasonic transducer is set to substantially intersect said predetermined rotational center, by arranging a reference measurement jig, instead of said object, substantially concentrically with said predetermined rotational center, radiating an ultrasonic wave from said ultrasonic transducer, swinging said ultrasonic transducer about a center of the ultrasonic radiation surface thereof while detecting a reflected wave at the surface of said reference measurement jig, and fixing said ultrasonic transducer at a swung position where a distance over which the ultrasonic wave is propagated from radiation to reception thereof by said ultrasonic transducer is minimum.

11. An apparatus for measuring a profile of an object having a surface and located in a predetermined position under water, comprising:

a water tank;

supporting means for supporting the object in the water filled in said water tank;

an ultrasonic transducer immersed in the water filled in said water tank, for radiating an ultrasonic wave towards aid object and receiving a reflected wave reflected from the surface of said object;

first moving means for moving said ultrasonic transducer sequentially to a plurality of measurement points on an arc equidistant from a predetermined rotational center while opposing said ultrasonic transducer to said predetermined rotational center;

second moving means for moving said supporting means relative to said ultrasonic transducer, and setting said object in the predetermined position in said water tank; and control and calculation means for delivering a drive signal to said first moving means to move said ultrasonic transducer sequentially to said measurement points, causing said ultrasonic transducer to radiate an ultrasonic wave when said ultrasonic transducer is in each of said measurement points, calculating a distance between said ultrasonic transducer and the surface of the object in accordance with a difference between the time said ultrasonic transducer radiates the ultrasonic wave and the time said ultrasonic transducer receives the reflected wave reflected at the surface of the object, calculating coordinates of the surface of the object from coordinates of each of said measurement points and the calculated distance corresponding thereto, and obtaining the profile of the object from the calculated coordinates of the surface of the object at each of said measurement points;

said supporting means having a recess opposed to said ultrasonic transducer, for receiving the object, and a groove extending along the direction of movement of said ultrasonic transducer and having a bottom deeper than that of said recess.

12. The apparatus according to claim 11, wherein said recess of said supporting means comprises a circular recess, and a blind hole concentric with said circular recess, having a diameter smaller than that of said circular recess and having a conically inclined bottom surface.

13. The apparatus according to claim 11, wherein a cover is fitted around said supporting means, said cover having a conical end face facing said ultrasonic transducer, and an opening extending from said conical end face to a peripheral surface thereof and coinciding with said groove of said supporting means.

14. The apparatus according to claim 11, wherein said ultrasonic transducer is provided with swinging means for swinging said ultrasonic transducer about the center of ultrasonic radiation surface of said ultrasonic transducer.

15. The apparatus according to claim 11, which comprises damping means arranged in said water tank and having a plurality of small holes, for damping surge of the water caused by movement of said ultrasonic transducer.

* * * * *